United States Patent
Otaka

(10) Patent No.: US 9,800,816 B2
(45) Date of Patent: Oct. 24, 2017

(54) SIGNAL READOUT CIRCUIT AND METHOD FOR CONTROLLING SIGNAL READOUT CIRCUIT

(71) Applicant: OLYMPUS CORPORATION, Hachioji-shi, Tokyo (JP)

(72) Inventor: Toshinori Otaka, Tsukuba (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/133,602

(22) Filed: Apr. 20, 2016

(65) Prior Publication Data

US 2016/0234451 A1   Aug. 11, 2016

Related U.S. Application Data

(63) Continuation of application No. PCT/JP2014/076069, filed on Sep. 30, 2014.

(30) Foreign Application Priority Data

Oct. 25, 2013 (JP) ................................. 2013-222425

(51) Int. Cl.
*H04N 5/335* (2011.01)
*H04N 5/378* (2011.01)
(Continued)

(52) U.S. Cl.
CPC ........... *H04N 5/378* (2013.01); *H04N 5/3575* (2013.01); *H04N 5/3742* (2013.01); *H04N 5/37457* (2013.01)

(58) Field of Classification Search
CPC ............. H04N 5/37457; H04N 5/3575; H04N 5/3742; H04N 5/378
See application file for complete search history.

(56) References Cited

U.S. PATENT DOCUMENTS 6,529,237 B1    3/2003 Tsay et al.
6,587,143 B1 *  7/2003 Boisvert .............. G11C 27/026
                                                             348/241

(Continued)

FOREIGN PATENT DOCUMENTS

JP      2004-186790 A    7/2004
JP         5390051 B1    1/2014

OTHER PUBLICATIONS

International Search Report dated Dec. 16, 2014, issued in counterpart International Application No. PCT/JP2014/076069 (1 pages).

(Continued)

*Primary Examiner* — Lin Ye
*Assistant Examiner* — John H Morehead, III
(74) *Attorney, Agent, or Firm* — Westerman, Hattori, Daniels & Adrian, LLP

(57) ABSTRACT

Provided is a signal readout circuit including: a first capacitor that holds a first electric charge; a second capacitor that holds a second electric charge; an amplifier section including an amplifier having first and second input terminals and first and second output terminals, outputting a first potential input to the first input terminal to the first output terminal with a gain of 1 and outputting a second potential input to the second input terminal to the second output terminal with a gain of 1; and a switch circuit that switches on/off state of a connection of a terminal of the first or second capacitor with at least one of the first and second input terminals and the first and second output terminals of the amplifier, wherein a difference between the first electric charge and the second electric charge is an amount indicating a voltage value of a predetermined voltage signal.

4 Claims, 12 Drawing Sheets

(51) Int. Cl.
*H04N 5/3745* (2011.01)
*H04N 5/357* (2011.01)
*H04N 5/374* (2011.01)

(56) References Cited

U.S. PATENT DOCUMENTS

| | | | | |
|---|---|---|---|---|
| 2009/0102695 | A1* | 4/2009 | Kawahito | H03M 1/08 |
| | | | | 341/172 |
| 2009/0273500 | A1* | 11/2009 | Krymski | H03M 1/144 |
| | | | | 341/155 |
| 2010/0079646 | A1* | 4/2010 | Yin | H01L 27/14609 |
| | | | | 348/308 |
| 2012/0104228 | A1* | 5/2012 | Souchkov | H04N 5/378 |
| | | | | 250/208.1 |
| 2013/0271626 | A1* | 10/2013 | Chou | G01J 1/46 |
| | | | | 348/241 |
| 2014/0034810 | A1* | 2/2014 | Akahane | H04N 5/359 |
| | | | | 250/208.1 |
| 2014/0048682 | A1* | 2/2014 | Kim | H04N 5/378 |
| | | | | 250/208.1 |

OTHER PUBLICATIONS

Mends et al. "CMOS Active Pixel Image Sensors for Highly Integrated Imaging Systems", IEEE Journal of Solid-State Circuits, vol. 32, No. 2, Feb. 1997, (11 pages).

* cited by examiner

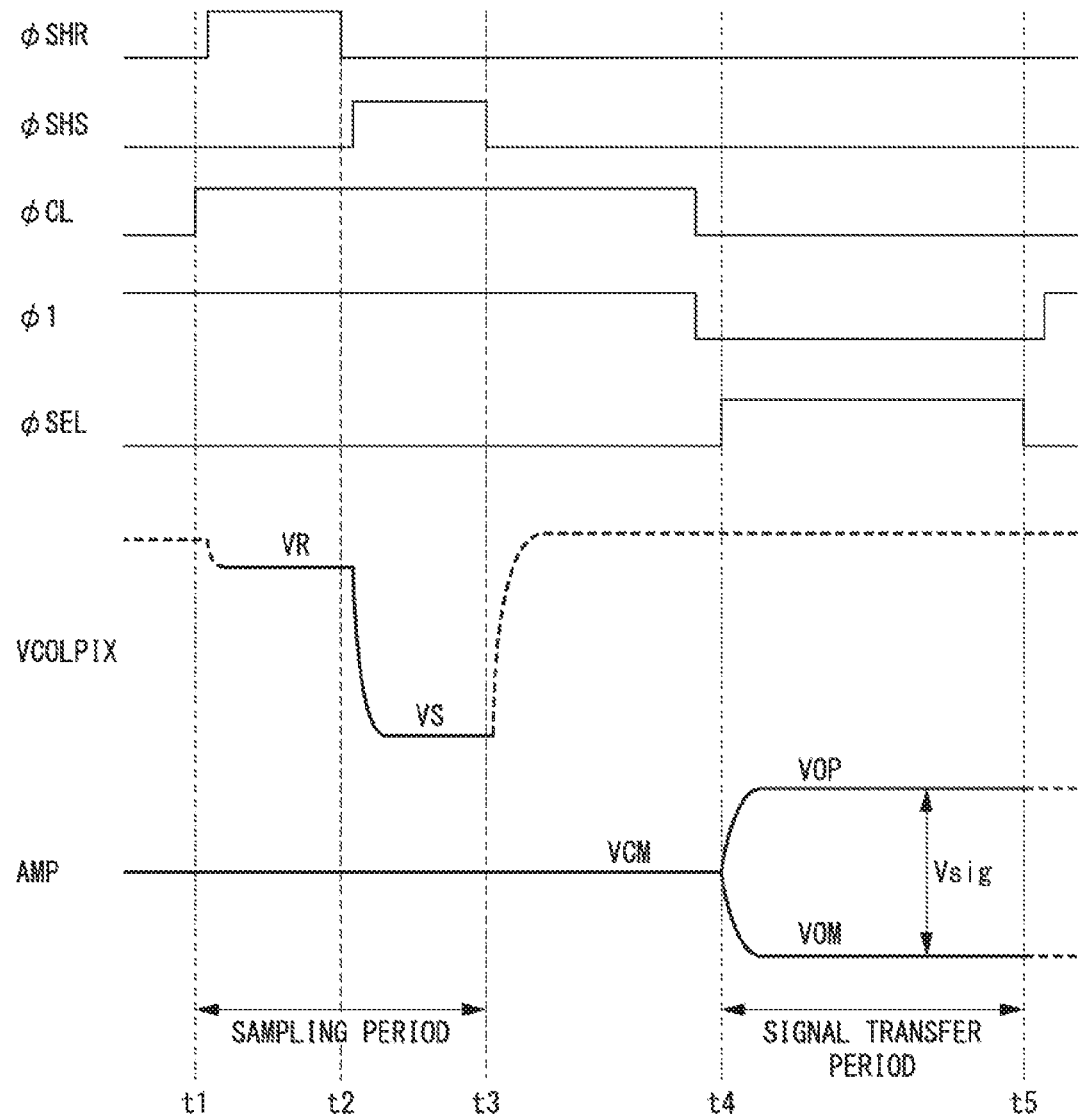

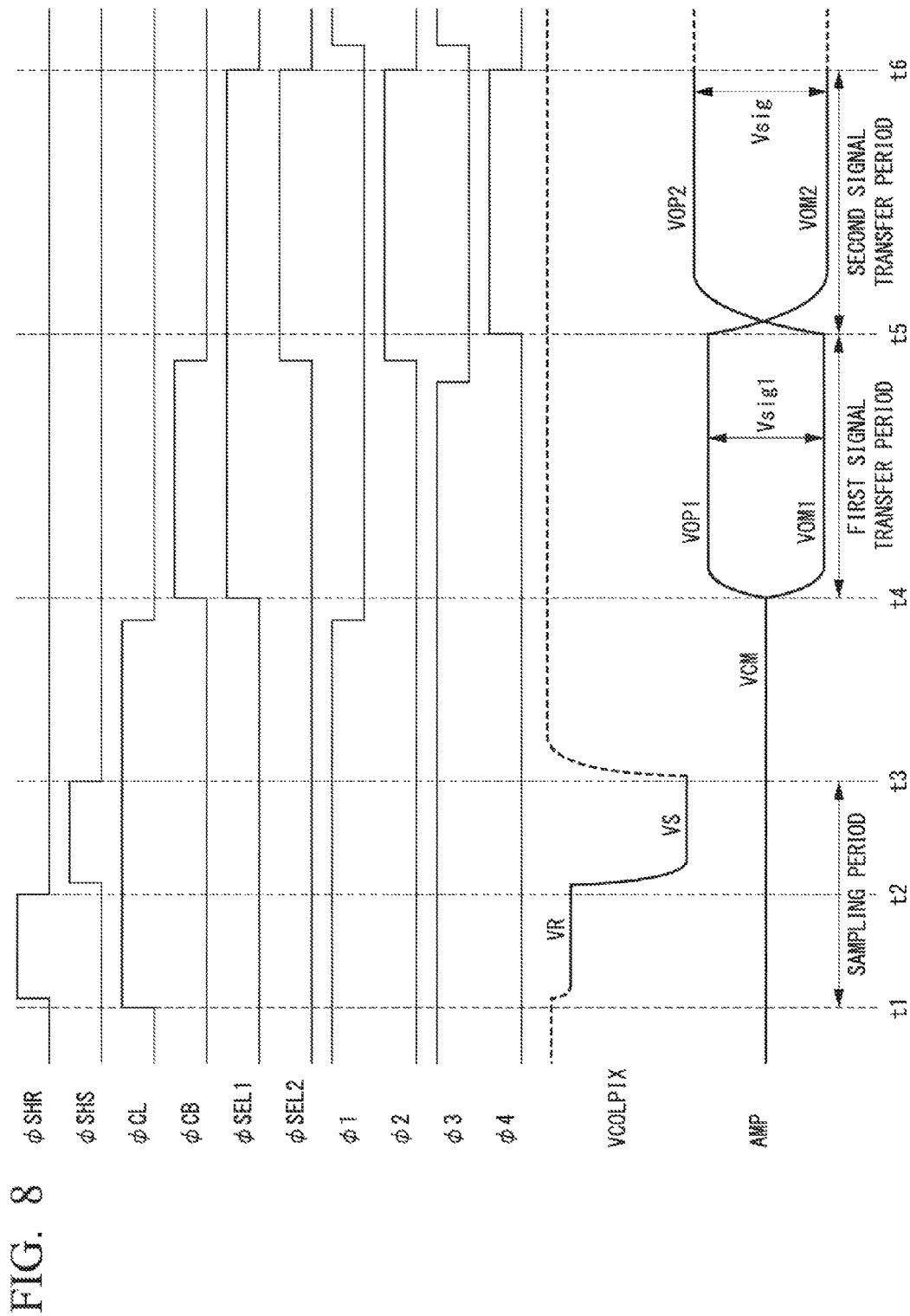

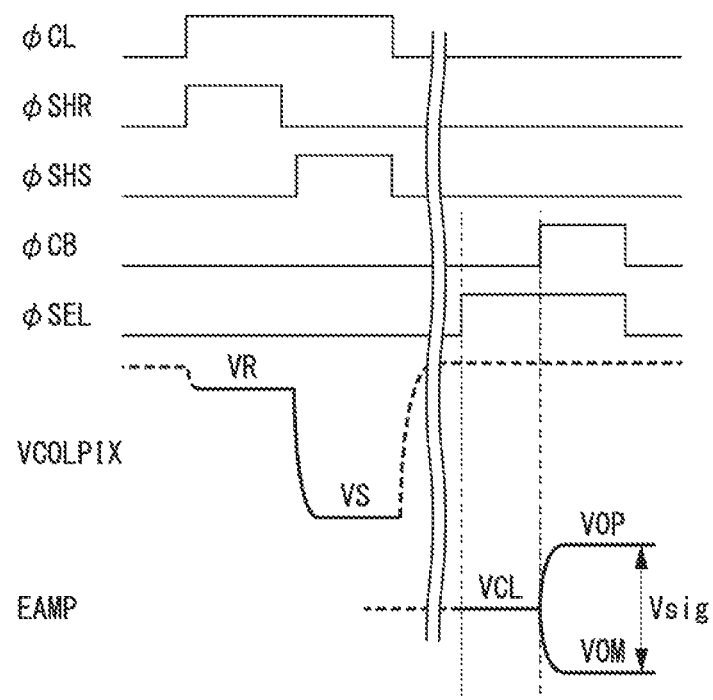

SIGNAL READOUT CIRCUIT AND METHOD FOR CONTROLLING SIGNAL READOUT CIRCUIT

This application is a continuation application based on a PCT International Application No. PCT/JP2014/076069, filed on Sep. 30, 2014, whose priority is claimed on Japanese Patent Application No. 2013-222425, filed Oct. 25, 2013. Both of the content of the PCT International Application and the Japanese Application are incorporated herein by reference.

BACKGROUND OF THE INVENTION

Field of the Invention

The present invention relates to a signal readout circuit, and more particularly, to a signal readout circuit provided in each column of a solid-state imaging device and a method for controlling the signal readout circuit.

Description of Related Art

In recent years, complementary metal oxide semiconductor (CMOS) image sensors have been gathering attention and put to practical use as solid-state imaging devices. A CMOS image sensor can easily cope with SOC (system on chip) for realizing multi-functional image sensors since a CMOS image sensor can be manufactured using the same manufacturing process as ordinary semiconductors, compared to charge coupled device (CCD) image sensors which are manufactured using a dedicated manufacturing process.

Thus, a column-parallel AD conversion-type configuration in which a signal processing circuit having an analog-to-digital (AD) converter that converts analog signals to digital signals is disposed in each column of a pixel array is generally used in CMOS image sensors in which the product (hereinafter referred to as "image output data rate") of a pixel count and a frame rate is large, for example. In the column-parallel AD conversion-type CMOS image sensor, since all signal processing circuits including the AD converter are disposed in each column of the pixel array, each signal processing circuit has a layout shape that extends in a column direction as a pixel interval (pitch) decreases. Thus, for example, in a CMOS image sensor having a small number of pixels and a small imaging surface, the central position of a chip is greatly shifted from the central position of an imaging surface (pixel array), and optical design is difficult in a system on which the column-parallel AD conversion-type image sensor is mounted. Moreover, since the same number of signal processing circuits as the number of columns of the pixel array are disposed in the column-parallel AD conversion-type CMOS image sensor, the area occupied by the signal processing circuits in the chip increases (the area corresponds to a product of the number of columns and the area of one signal processing circuit). Thus, the area of the entire chip of the CMOS image sensor (hereinafter referred to as a "chip area") increases, which is not desirable for reducing the chip size.

On the other hand, a global AD conversion-type configuration in which one AD converter is disposed to be shared by all signal processing circuits rather than providing the AD converter in each signal processing circuit disposed in each column of a pixel array is generally used in CMOS image sensors which have a low image output data rate and require low power consumption, for example. The global AD conversion-type CMOS image sensor uses a column-double sampling method in which a signal processing circuit (not including the AD converter) disposed in each column of the pixel array samples two voltages including a pixel floating diffusion layer reset signal voltage (hereinafter referred to as a reset signal voltage) VR and a pixel optical signal voltage (hereinafter referred to as an optical signal voltage) VS output from pixels of a corresponding column to perform correlated double sampling. The optical signal voltage VS also includes a reset signal voltage VR generated after the pixel floating diffusion layer is reset. Thus, correlated double sampling is performed to obtain a pixel signal voltage indicating only subject light to which pixels are exposed by removing the reset signal voltage VR included in the optical signal voltage VS.

Since the column-double sampling-type signal processing circuit may include only two sampling capacitors as major components, the length in the column direction of the layout shape of the signal processing circuits disposed in each column can be reduced. Thus, the global AD conversion-type CMOS image sensor has a remarkable advantage that an increase in the chip area can be suppressed more than the column-parallel AD conversion-type CMOS image sensor and the chip size can be reduced.

For example, Japanese Unexamined Patent Application, First Publication No. 2004-186790 discloses a technique related to a solid-state imaging device which includes a column-double sampling-type signal processing circuit (see FIG. 9A) in each column of a pixel array. In the conventional signal processing circuit illustrated in FIG. 9A, a sampling operation of sampling two signal voltages output from pixels and a signal transferring operation of transferring the sampled two signal voltages are performed based on a clamp voltage VCL connected via switches S3 and S4 driven by a clamp signal φCL. That is, the signal processing circuit illustrated in FIG. 9A is a signal processing circuit that is configured to first convert a signal voltage output from each pixel 1 to an electric charge, then convert the electric charge to a voltage, and read the voltage.

Here, the operation of the conventional signal processing circuit disclosed in Japanese Unexamined Patent Application, First Publication No. 2004-186790 will be described with reference to the timing chart illustrated in FIG. 9B. First, the sampling operation involves sequentially driving sampling signals φSHR and φSHS so that a switch S1 is connected to a sampling capacitor $C_{SR}$ and a switch S2 is connected to a sampling capacitor $C_{SS}$. As a result, an electric charge corresponding to a potential difference between the clamp voltage VCL and a reset signal voltage VR or an optical signal voltage VS output from the pixels 1 to a column circuit 7 via a pixel output line VCOLPIX is stored (sampled) in the sampling capacitors $C_{SR}$ and $C_{SS}$.

The signal transferring operation involves driving a select signal φSEL to connect one set of terminals of the sampling capacitors $C_{SR}$ and $C_{SS}$ to a charge amplifier circuit 8 via switches S5 and S6. After that, a driving signal φCB is driven to connect the other set of terminals of the sampling capacitors $C_{SR}$ and $C_{SS}$ via a switch S0 so that the potential of the other set of terminals becomes an intermediate potential between the reset signal voltage VR and the optical signal voltage VS.

As a result, an electric charge corresponding to a change in the potential of the other terminal of the sampling capacitor $C_{SR}$ (that is, an electric charge corresponding to a potential difference between the intermediate potential and the potential of the reset signal voltage VR) is discharged from one terminal of the sampling capacitor $C_{SR}$ and is transferred to one terminal of a feedback capacitor $C_{FB1}$ connected to one input terminal of a charge amplifier EAMP. Moreover, an electric charge corresponding to a change in the potential of the other terminal of the sampling capacitor $C_{SS}$ (that is, an electric charge corresponding to a potential difference between the intermediate potential and the potential of the optical signal voltage VS) is discharged from one terminal of the sampling capacitor $C_{SS}$ and is transferred to one terminal of a feedback capacitor $C_{FB2}$ connected to the other input terminal of the charge amplifier EAMP.

As a result, an electric charge having the opposite polarity from the electric charge transferred to one terminal of the feedback capacitor $C_{FB1}$ is supplied from one output terminal of the charge amplifier EAMP to the other terminal of the feedback capacitor $C_{FB1}$. Thus, one output terminal of the charge amplifier EAMP has a reset signal voltage VOM having a potential corresponding to the supplied electric charge (that is, a potential proportional to an electric charge corresponding to a potential difference between the clamp voltage VCL and the reset signal voltage VR sampled to the sampling capacitor $C_{SR}$) (that is, a potential proportional to the reset signal voltage VR). Moreover, an electric charge having the opposite polarity from the electric charge transferred to one terminal of the feedback capacitor $C_{FB2}$ is supplied from the other output terminal of the charge amplifier EAMP to the other terminal of the feedback capacitor $C_{FB2}$. Thus, the other output terminal of the charge amplifier EAMP has an optical signal voltage VOP having a potential corresponding to the supplied electric charge (that is, a potential proportional to an electric charge corresponding to a potential difference between the clamp voltage VCL and the optical signal voltage VS sampled to the sampling capacitor $C_{SS}$) (that is, a potential proportional to the optical signal voltage VS).

After that, a difference between the reset signal voltage VOM output from one output terminal of the charge amplifier EAMP and the optical signal voltage VOP output from the other output terminal is calculated to obtain a signal component Vsig of only subject light to which the pixels 1 are exposed.

Moreover, for example, "CMOS Active Pixel Image Sensors for Highly Integrated Imaging Systems." by Sunetra K. Mendis, et al., IEEE Journal of Solid-State Circuits, Vol. 32, No. 2, February, 1997, hereinafter referred to as a "Non-Patent Literature 1", proposes a solid-state imaging device in which a signal processing circuit (see FIG. 10A) including two voltage amplifier circuits is provided in each column of a pixel array. The conventional signal processing circuit illustrated in FIG. 10A performs a sampling operation and a signal transferring operation based on the ground potential. That is, the signal processing circuit illustrated in FIG. 10A is a signal processing circuit configured to read the signal voltages output from the respective pixels 1 in the form of voltage.

Here, the operation of the conventional signal processing circuit proposed in Non-Patent Literature 1 will be described with reference to the timing chart illustrated in FIG. 10B. First, the sampling operation involves sequentially driving a sampling signal ϕSHR and a sampling signal ϕSHS so that a switch S1 is connected to a sampling capacitor $C_{SR}$ and a switch S2 is connected to a sampling capacitor $C_{SS}$. Moreover, an electric charge corresponding to a potential difference between the ground potential and the reset signal voltage VR or the optical signal voltage VS output to the column circuit 9 via the pixel output line VCOLPIX from the pixels 1 (that is, the voltage of the reset signal voltage VR or the optical signal voltage VS) is sampled to the sampling capacitors $C_{SR}$ and $C_{SS}$. As a result, an amplified voltage of the reset signal voltage VR sampled to the sampling capacitor $C_{SR}$ is output from a voltage amplifier CAMP1 and an amplified voltage of the optical signal voltage VS sampled to the sampling capacitor $C_{SS}$ is output from a voltage amplifier CAMP2.

The signal transferring operation involves driving a select signal ϕSEL to connect switches S5 and S6 to output a reset signal voltage VOM obtained by the voltage amplifier CAMP1 amplifying the reset signal voltage VR and an optical signal voltage VOP obtained by the voltage amplifier CAMP2 amplifying the optical signal voltage VS. A difference between the reset signal voltage VOM and the optical signal voltage VOP output by the voltage amplifiers CAMP1 and CAMP2, respectively, is calculated to obtain a signal component Vsig of the pixels 1.

After that, in the conventional signal processing circuit proposed in Non-Patent Literature 1, in order to read signals with higher accuracy, a driving signal ϕCB is driven to connect one set of terminals of the sampling capacitors $C_{SR}$ and $C_{SS}$ via a switch S0 so that the potential of one set of terminals becomes an intermediate potential between the reset signal voltage VR and the optical signal voltage VS. As a result, an amplified voltage of the intermediate potential between the reset signal voltage VR and the optical signal voltage VS is output from the voltage amplifiers CAMP1 and CAMP2.

An operation circuit (not illustrated) at a subsequent stage of the signal processing circuit subtracts the output amplified voltage of the intermediate potential from the voltage of the signal component Vsig obtained through the difference operation. In this way, the conventional signal processing circuit proposed in Non-Patent Literature 1 can obtain a signal component having higher accuracy in which an offset variation of the voltage amplifiers CAMP1 and CAMP2 included in the signal component Vsig is cancelled. The readout method used in the conventional signal processing circuit proposed in Non-Patent Literature 1 is a readout method called a delta-difference sampling (DDS) scheme.

SUMMARY OF INVENTION

According to a first aspect of the present invention, there is provided a signal readout circuit including: a first capacitor that holds a first electric charge; a second capacitor that holds a second electric charge: an amplifier section including an amplifier having first and second input terminals and first and second output terminals, the amplifier outputting a first potential input to the first input terminal to the first output terminal with a gain of 1 and outputting a second potential input to the second input terminal to the second output terminal with a gain of 1; and a switch circuit that switches on/off state of a connection of a terminal of the first or second capacitor with at least one of the first and second input terminals and the first and second output terminals of the amplifier, wherein a difference between the first electric charge and the second electric charge is an amount indicating a voltage value of a predetermined voltage signal, the first capacitor holds the first electric charge and the second capacitor holds the second electric charge when the switch circuit is in a first state, and the switch circuit switches the connections of the respective terminals so that the first capacitor is connected between the first input terminal and the first output terminal and the second capacitor is connected between the second input terminal and the second output terminal when the switch circuit is in a second state.

According to a second aspect of the present invention, in the signal readout circuit of the first aspect, the amplifier section may further include: a third capacitor: and a fourth capacitor, the switch circuit may allow the first capacitor to be connected to the second capacitor, the third capacitor to be connected between the first capacitor and the first output terminal, and the fourth capacitor to be connected between the second capacitor and the second output terminal in a third state before the second state starts and after the first state ends, and further to an operation in the third state, the switch circuit may switch the connections of the respective terminals so that the third capacitor is connected between the first capacitor and a predetermined fixed potential and the fourth capacitor is connected between the second capacitor and the predetermined fixed potential in the second state.

According to a third aspect of the present invention, in the signal readout circuit of the first or second aspect, the first electric charge may be an amount of electric charge corresponding to a potential of a reset signal which is output from a pixel section in which a plurality of pixels are disposed in a two-dimensional matrix form and which is generated when a physical amount is not incident on each of the plurality of pixels disposed in the pixel section, the second electric charge may be an amount of electric charge corresponding to the sum of the potential of the reset signal and a potential of a pixel signal which is output from the pixel section and which is generated according to the physical amount incident on each of the plurality of pixels disposed in the pixel section, the first and second capacitors may be disposed in each column of the plurality of pixels disposed in the pixel section.

According to a fourth aspect of the present invention, in the signal readout circuit of the third aspect, the amplifier section may be disposed in each of a plurality of columns of the plurality of pixels disposed in the pixel section.

According to a fifth aspect of the present invention, there is provided a method for controlling a signal readout circuit including: a first capacitor that holds a first electric charge; a second capacitor that holds a second electric charge; an amplifier section including an amplifier having first and second input terminals and first and second output terminals, the amplifier outputting a first potential input to the first input terminal to the first output terminal with a gain of 1 and outputting a second potential input to the second input terminal to the second output terminal with a gain of 1; and a switch circuit that switches on/off state of a connection of a terminal of the first or second capacitor with at least one of the first and second input terminals and the first and second output terminals of the amplifier, wherein a difference between the first electric charge and the second electric charge is an amount indicating a voltage value of a predetermined voltage signal, the method including: a first state of the switch circuit in which the first capacitor holds the first electric charge and the second capacitor holds the second electric charge, and a second state of the switch circuit in which the switch circuit switches the connections of the respective terminals so that the first capacitor is connected between the first input terminal and the first output terminal and the second capacitor is connected between the second input terminal and the second output terminal.

BRIEF DESCRIPTION OF THE DRAWINGS

FIG. 2 is a timing chart illustrating an example of signal readout timings in the signal readout circuit of the first embodiment.

FIG. 8 is a timing chart illustrating an example of signal readout timings in the signal readout circuit of the second embodiment.

FIG. 9B is a diagram for describing an operation of the conventional signal processing circuit.

DETAILED DESCRIPTION OF THE INVENTION

First Embodiment

Figure 1:
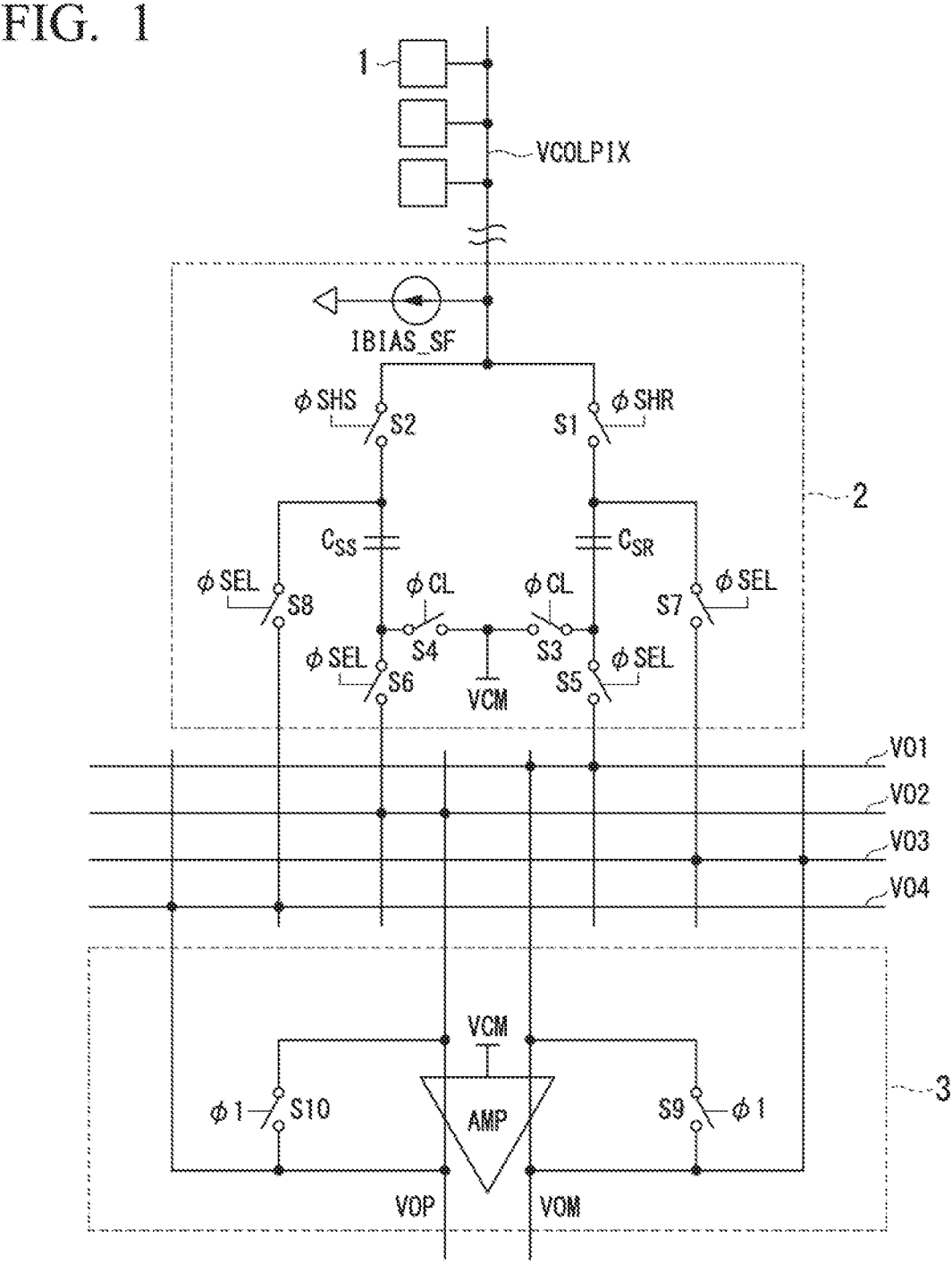
FIG. 1 is a circuit diagram illustrating a schematic configuration of a signal readout circuit according to a first embodiment of the present invention.

Hereinafter, an embodiment of the present invention will be described with reference to the drawings. FIG. 1 is a circuit diagram illustrating a schematic configuration of a signal readout circuit according to a first embodiment. In FIG. 1, the signal readout circuit includes a column circuit unit 2, four column output lines VO1 to VO4, and an amplifier section 3. FIG. 1 also illustrates constituent elements (more specifically, a pixel section made up of three pixels 1 disposed in the same column to output signal voltages to the column circuit unit 2 via a pixel output line VCOLPIX) that output signal voltages to the column circuit unit 2 provided in the signal readout circuit. The signal readout circuit of the first embodiment is a signal readout circuit configured to read signal voltages output from the respective pixels 1 in the form of voltage.

The column circuit unit 2 stores (samples) an electric charge corresponding to a potential difference between a clamp voltage VCM and a signal voltage output from any one of the pixels 1 in the pixel section via the pixel output line VCOLPIX as a voltage. The column circuit unit 2 includes a constant current circuit IBIAS_SF, a sampling capacitor $C_{SR}$, a sampling capacitor $C_{SS}$, and switches S1 to S8.

The constant current circuit IBIAS_SF is a constant-current source of which one end is connected to the pixel output line VCOLPIX and the other end is connected to the ground of the column circuit unit 2. The constant current circuit IBIAS_SF supplies a constant current to the pixel output line VCOLPIX to bias a signal voltage output amplifier in the pixel 1 that outputs the signal voltage.

The sampling capacitor $C_{SR}$ is a capacitor that samples and holds an electric charge corresponding to a potential of a reference voltage (that is, a pixel floating diffusion layer reset signal voltage (hereinafter referred to as a "reset signal voltage") VR) serving as the reference of the signal voltage output by the pixel 1 as a voltage of the reset signal voltage VR.

The sampling capacitor $C_{SS}$ is a capacitor that samples and holds an electric charge corresponding to a potential of a signal component voltage (that is, a pixel optical signal voltage (hereinafter referred to as an "optical signal voltage") VS) which is a signal component of the signal voltage output by the pixel 1 as a voltage of the optical signal voltage VS. The optical signal voltage VS also includes a voltage component of the reset signal voltage VR generated after pixels are reset.

The switch S1 is a switch that selects the reset signal voltage VR input from the pixel 1 via the pixel output line VCOLPIX and connects a signal line connected to the pixel output line VCOLPIX and one terminal of the sampling capacitor $C_{SR}$ according to a sampling signal ϕSHR.

The switch S2 is a switch that selects the optical signal voltage VS input from the pixel 1 via the pixel output line VCOLPIX and connects the signal line connected to the pixel output line VCOLPIX and one terminal of the sampling capacitor $C_{SS}$ according to a sampling signal ϕSHS.

The switch S3 is a switch that connects the other terminal of the sampling capacitor $C_{SR}$ and the clamp voltage VCM when the column circuit unit 2 performs an operation of sampling the reset signal voltage VR, and allows the other terminal of the sampling capacitor $C_{SR}$ to be short-circuited to the clamp voltage VCM according to a clamp signal ϕCL.

The switch S4 is a switch that connects the other terminal of the sampling capacitor $C_{SS}$ and the clamp voltage VCM when the column circuit unit 2 performs an operation of sampling the optical signal voltage VS, and allows the other terminal of the sampling capacitor $C_{SS}$ to be short-circuited to the clamp voltage VCM according to the clamp signal ϕCL.

The switch S5 is a switch that connects the other terminal of the sampling capacitor $C_{SR}$ and the column output line VO1 when the column circuit unit 2 performs an operation of transferring the reset signal voltage VR sampled to the sampling capacitor $C_{SR}$ to the amplifier section 3, and allows the other terminal of the sampling capacitor $C_{SR}$ to be short-circuited to a signal line connected to the column output line VO1 according to a select signal ϕSEL. When the other terminal of the sampling capacitor $C_{SR}$ and the column output line VO1 are connected by the switch S5, the reset signal voltage VR sampled to the sampling capacitor $C_{SR}$ is input to one amplifier input terminal of the amplifier section 3 via the column output line VO1.

The switch S6 is a switch that connects the other terminal of the sampling capacitor $C_{SS}$ and the column output line VO2 when the column circuit unit 2 performs an operation of transferring the optical signal voltage VS sampled to the sampling capacitor $C_{SS}$ to the amplifier section 3, and allows the other terminal of the sampling capacitor $C_{SS}$ to be short-circuited to a signal line connected to the column output line VO2 according to the select signal ϕSEL. When the other terminal of the sampling capacitor $C_{SS}$ and the column output line VO2 are connected by the switch S6, the optical signal voltage VS sampled to the sampling capacitor $C_{SS}$ is input to the other amplifier input terminal of the amplifier section 3 via the column output line VO2.

The switch S7 is a switch that connects one terminal of the sampling capacitor $C_{SR}$ and the column output line VO3 when the column circuit unit 2 performs an operation of transferring the reset signal voltage VR sampled to the sampling capacitor $C_{SR}$ to the amplifier section 3, and allows one terminal of the sampling capacitor $C_{SR}$ to be short-circuited to a signal line connected to the column output line VO3 according to the select signal ϕSEL. When one terminal of the sampling capacitor $C_{SR}$ and the column output line VO3 are connected by the switch S7, a voltage VOM output from one amplifier output terminal of the amplifier section 3 is input to one terminal of the sampling capacitor $C_{SR}$ via the column output line VO3.

The switch S8 is a switch that connects one terminal of the sampling capacitor $C_{SS}$ and the column output line VO4 when the column circuit unit 2 performs an operation of transferring the optical signal voltage VS sampled to the sampling capacitor $C_{SS}$ to the amplifier section 3, and allows one terminal of the sampling capacitor $C_{SS}$ to be short-circuited to a signal line connected to the column output line VO4 according to the select signal ϕSEL. When one terminal of the sampling capacitor $C_{SS}$ and the column output line VO4 are connected by the switch S8, a voltage VOP output from the other amplifier output terminal of the amplifier section 3 is input to one terminal of the sampling capacitor $C_{SS}$ via the column output line VO4.

The amplifier section 3 amplifies the signal voltages sampled by the column circuit unit 2 and outputs the amplified signal voltages as voltages corresponding to the signal voltages output from the pixels 1. The amplifier section 3 includes an operational amplifier circuit AMP, a switch S9, and a switch S10.

The operational amplifier circuit AMP is configured such that the reset signal voltage VR input from the column circuit unit 2 to one amplifier input terminal of the amplifier section 3 via the column output line VO1 is input to one input terminal thereof and the input reset signal voltage VR is amplified based on the clamp voltage VCM and output from one output terminal thereof. The operational amplifier circuit AMP amplifies the reset signal voltage VR output from the pixel 1 with a gain "1" (gain=1), outputs the amplified reset signal voltage VR from the amplifier section 3 as the reset signal voltage VOM, and outputs the reset signal voltage VOM also to the column circuit unit 2 via the column output line VO3.

The operational amplifier circuit AMP is also configured such that the optical signal voltage VS input from the column circuit unit 2 to the other amplifier input terminal of the amplifier section 3 via the column output line VO2 is input to the other input terminal thereof and the input optical signal voltage VS is amplified based on the clamp voltage VCM and output from the other output terminal thereof. The operational amplifier circuit AMP amplifies the optical signal voltage VS output from the pixel 1 with a gain "1" (gain=1), outputs the amplified optical signal voltage VS from the amplifier section 3 as the optical signal voltage VOP, and outputs the optical signal voltage VOP to the column circuit unit 2 via the column output line VO4.

The switch S9 is a switch that initializes the operational amplifier circuit AMP and allows one input terminal of the operational amplifier circuit AMP to be short-circuited to one output terminal thereof according to a driving signal ϕ1 to thereby initialize the operational amplifier circuit AMP.

The switch S10 is a switch that initializes the operational amplifier circuit AMP and allows the other input terminal of the operational amplifier circuit AMP to be short-circuited to the other output terminal according to the driving signal ϕ1 to thereby initialize the operational amplifier circuit AMP.

As described above, the signal readout circuit of the first embodiment has a configuration in which both terminals of the sampling capacitors (the sampling capacitors $C_{SR}$ and $C_{SS}$) in the column circuit unit 2 are switchably connected to the amplifier section 3. More specifically, the signal readout circuit further includes the switches S7 and S8 in the column circuit unit 2 in addition to the switches S5 and S6 which were provided in the conventional signal processing circuit. With this configuration, the sampling capacitors provided in the column circuit unit 2 can also operate as a feedback capacitor connected between one input terminal and one output terminal of the operational amplifier circuit AMP.

Next, the operation timings of the signal readout circuit of the first embodiment will be described. FIG. 2 is a timing chart illustrating an example of signal readout timings in the signal readout circuit of the first embodiment. FIG. 2 illustrates an example of operation timings in which the reset signal voltage VR and the optical signal voltage VS output from one pixel 1 to the pixel output line VCOLPIX are sampled to output the reset signal voltage VOM having the potential corresponding to the reset signal voltage VR and the optical signal voltage VOP having the potential corresponding to the optical signal voltage VS (that is, the signal voltages output from one pixel 1 are read and output to the constituent elements of the subsequent stage).

In the signal readout circuit of the first embodiment, first, in a sampling period, the column circuit unit 2 samples the reset signal voltage VR and the optical signal voltage VS input from the pixels 1 via the pixel output line VCOLPIX. The driving signal φ1 is set to a "High" level before the sampling period starts so that the switches S9 and S10 enter an ON state and the operational amplifier circuit AMP in the amplifier section 3 is held in an initialized state. As a result, the potential of the clamp voltage VCM is output from the output terminals of the operational amplifier circuit AMP.

In the sampling period, at time t1, the clamp signal φCL is set to the "High" level so that the switches S3 and S4 enter the ON state and the other terminal of the sampling capacitor $C_{SR}$ and the other terminal of the sampling capacitor $C_{SS}$ are short-circuited to the clamp voltage VCM. That is, the sampling capacitors $C_{SR}$ and $C_{SS}$ are clamped by the clamp voltage VCM.

After that, the sampling signal φSHR is set to the "High" level so that the reset signal voltage VR input from the pixel 1 via the pixel output line VCOLPIX is input to one terminal of the sampling capacitor $C_{SR}$ and the potential (that is, the reference voltage) of the reset signal voltage VR is sampled to the sampling capacitor $C_{SR}$ at time t2.

After that, the sampling signal φSHR is set to a "Low" level so that the input of the reset signal voltage VR to one terminal of the sampling capacitor $C_{SR}$ is stopped. After that, the sampling signal φSHS is set to the "High" level so that the optical signal voltage VS input from the pixel 1 via the pixel output line VCOLPIX is input to one terminal of the sampling capacitor $C_{SS}$. At time t3, a signal voltage including the potential of the optical signal voltage VS (that is, the reset signal voltage VR generated after the pixels are reset) and the pixel signal voltage indicating only subject light to which the pixels 1 are exposed is sampled to the sampling capacitor $C_{SS}$.

After that, the sampling signal φSHS is set to the "Low" level so that the input of the optical signal voltage VS to one terminal of the sampling capacitor $C_{SS}$ is stopped (that is, a sampling period in which the reset signal voltage VR and the optical signal voltage VS are sampled to the sampling capacitors $C_{SR}$ and $C_{SS}$, respectively). After that, the sampled signal voltages are held for a predetermined period.

After the predetermined period ends, the sampled signal voltages are transferred to the operational amplifier circuit AMP in the amplifier section 3 in a signal transfer period.

The clamp signal φCL is set to the "Low" level before the signal transfer period starts so that the switches S3 and S4 enter an OFF state and short-circuiting of the other terminal of the sampling capacitor $C_{SR}$ and the other terminal of the sampling capacitor $C_{SS}$ to the clamp voltage VCM is stopped. Moreover, the driving signal φ1 is set to the "Low" level so that the switches S9 and S10 enter the OFF state and the initialization of the operational amplifier circuit AMP is released.

In the signal transfer period, at time t4, the select signal φSEL is set to the "High" level. As a result, when the switch S5 enters the ON state, the other terminal of the sampling capacitor $C_{SR}$ in the column circuit unit 2 is connected to one input terminal of the operational amplifier circuit AMP in the amplifier section 3 via the column output line VO1. Moreover, when the switch S7 enters the ON state, one terminal of the sampling capacitor $C_{SR}$ in the column circuit unit 2 is connected to one output terminal of the operational amplifier circuit AMP in the amplifier section 3 via the column output line VO3. With this connection, the sampling capacitor $C_{SR}$ operates as a feedback capacitor disposed between one input terminal of the operational amplifier circuit AMP and one output terminal thereof. Moreover, the potential of the reset signal voltage VR sampled to the sampling capacitor $C_{SR}$ is input (transferred) to one input terminal of the operational amplifier circuit AMP via the column output line VO1. The reset signal voltage VR input to one input terminal (that is, the reset signal voltage VOM having the potential proportional to the potential of the reset signal voltage VR sampled to the sampling capacitor $C_{SR}$) is output from one output terminal of the operational amplifier circuit AMP. Moreover, the reset signal voltage VOM output from one output terminal of the operational amplifier circuit AMP is also input to one terminal of the sampling capacitor $C_{SR}$ via the column output line VO3.

When the switch S6 enters the ON state, the other terminal of the sampling capacitor $C_{SS}$ in the column circuit unit 2 is connected to the other input terminal of the operational amplifier circuit AMP in the amplifier section 3 via the column output line VO2. Moreover, when the switch S8 enters the ON state, one terminal of the sampling capacitor $C_{SS}$ in the column circuit unit 2 is connected to the other output terminal of the operational amplifier circuit AMP in the amplifier section 3 via the column output line VO4. With this connection, the sampling capacitor $C_{SR}$ operates as a feedback capacitor disposed between the other input terminal of the operational amplifier circuit AMP and the other output terminal thereof. Moreover, the potential of the optical signal voltage VS sampled to the sampling capacitor $C_{SS}$ is input (transferred) to the other input terminal of the operational amplifier circuit AMP via the column output line VO2. The optical signal voltage VS input to the other input terminal (that is, the optical signal voltage VOP having the potential proportional to the potential of the optical signal voltage VS sampled to the sampling capacitor $C_{SS}$) is output from the other output terminal of the operational amplifier circuit AMP. Moreover, the optical signal voltage VOP output from the other output terminal of the operational amplifier circuit AMP is also input to one terminal of the sampling capacitor $C_{SS}$ via the column output line VO4.

After that, at time t5, the select signal φSEL is set to the "Low" level so that the transfer to the operational amplifier circuit AMP, of the reset signal voltage VR and the optical signal voltage VS sampled to the sampling capacitors $C_{SR}$ and $C_{SS}$, respectively, ends. The constituent elements on the subsequent stage perform an operation of calculating the difference between the reset signal voltage VOM output from one output terminal of the operational amplifier circuit AMP and the optical signal voltage VOP output from the other output terminal whereby the signal component Vsig of only subject light to which the pixels 1 are exposed can be obtained. After the transfer of the respective sampled signal voltages to the operational amplifier circuit AMP ends, the driving signal φ1 may be set to the "High" level so that the switches S9 and S10 enter the ON state and the operational amplifier circuit AMP is initialized again.

As described above, in the signal readout circuit of the first embodiment, one set of terminals of two sampling capacitors (the sampling capacitors $C_{SR}$ and $C_{SS}$) is connected to the corresponding output terminals of the operational amplifier circuit AMP whereby the operational amplifier circuit AMP can output the reset signal voltage VR and the optical signal voltage VS sampled by the corresponding sampling capacitors from the output terminals thereof in the form of voltage. That is, since the signal readout circuit of the first embodiment reads the signal voltages input from the pixels 1 directly as the voltage rather than reading the signal voltages after converting them into electric charges as in the column circuit provided in the conventional signal processing circuit, it is possible to read the respective signal voltages without being influenced by the difference (variation) in the capacitance value of the respective sampling capacitors.

Similarly, the signal readout circuit of the first embodiment can read the respective signal voltages without being influenced by the nonlinear junction capacitance characteristics of the MOS transistors associated with the nodes connected to the respective sampling capacitors unlike the column circuit provided in the conventional signal processing circuit. Here, in the signal readout circuit of the first embodiment, for example, connection capacitors associated with the node connected to one terminal of the sampling capacitor $C_{SR}$ are the junction capacitances of a MOS transistor that forms the switch S1 driven by the sampling signal φSHR and a MOS transistor that forms the switch S7 driven by the select signal φSEL. Moreover, for example, connection capacitors associated with the node connected to the other terminal of the sampling capacitor $C_{SR}$ are the junction capacitances of a MOS transistor that forms the switch S3 driven by the clamp signal φCL and a MOS transistor that forms the switch S5 driven by the select signal φSEL.

As described above, the signal readout circuit of the first embodiment can read the respective signal voltages without being influenced by the difference (variation) in the capacitance values of the respective sampling capacitors and the nonlinear junction capacitance characteristics of the MOS transistors associated with the nodes connected to the respective sampling capacitors and thus decrease the capacitance values of the sampling capacitors. As a result, in the signal readout circuit of the first embodiment, it is possible to reduce the layout area of the respective sampling capacitors, and even when the signal readout circuit is provided in each column of a pixel array, it is possible to reduce the area occupied by the signal processing circuit including the signal readout circuits in the chip of a CMOS image sensor. In this way, it is possible to reduce the chip area of the CMOS image sensor including the signal readout circuit of the first embodiment.

In the signal readout circuit of the first embodiment, it is desirable to decrease the capacitance values of the respective sampling capacitors up to a capacitance value required for suppressing thermal noise to be within a desired noise level. This is because the influence of thermal noise in the respective sampling capacitors remains in the signal readout circuit of the first embodiment.

Figure 3A:
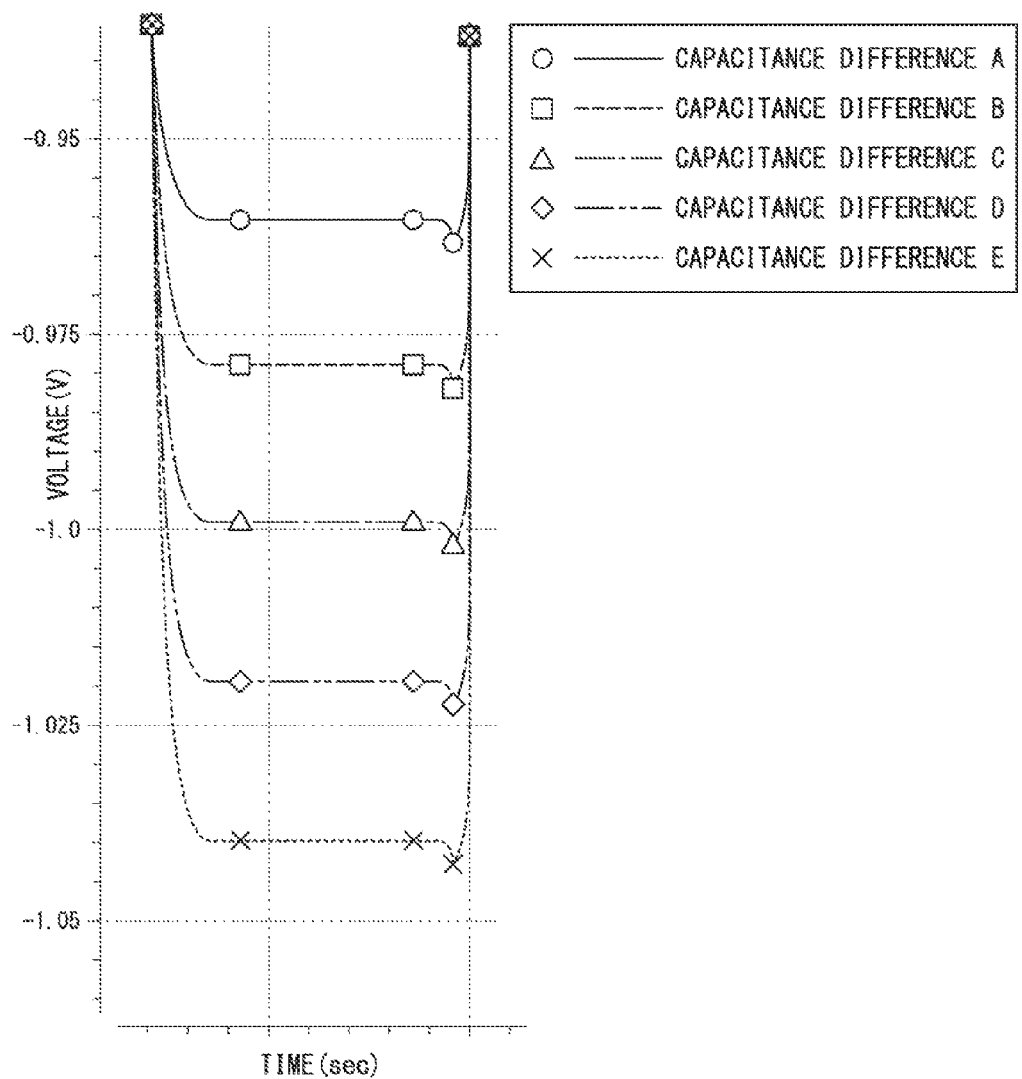
FIG. 3A is a diagram illustrating an example of the levels of signal voltages read by a conventional signal readout circuit.
Figure 3B:
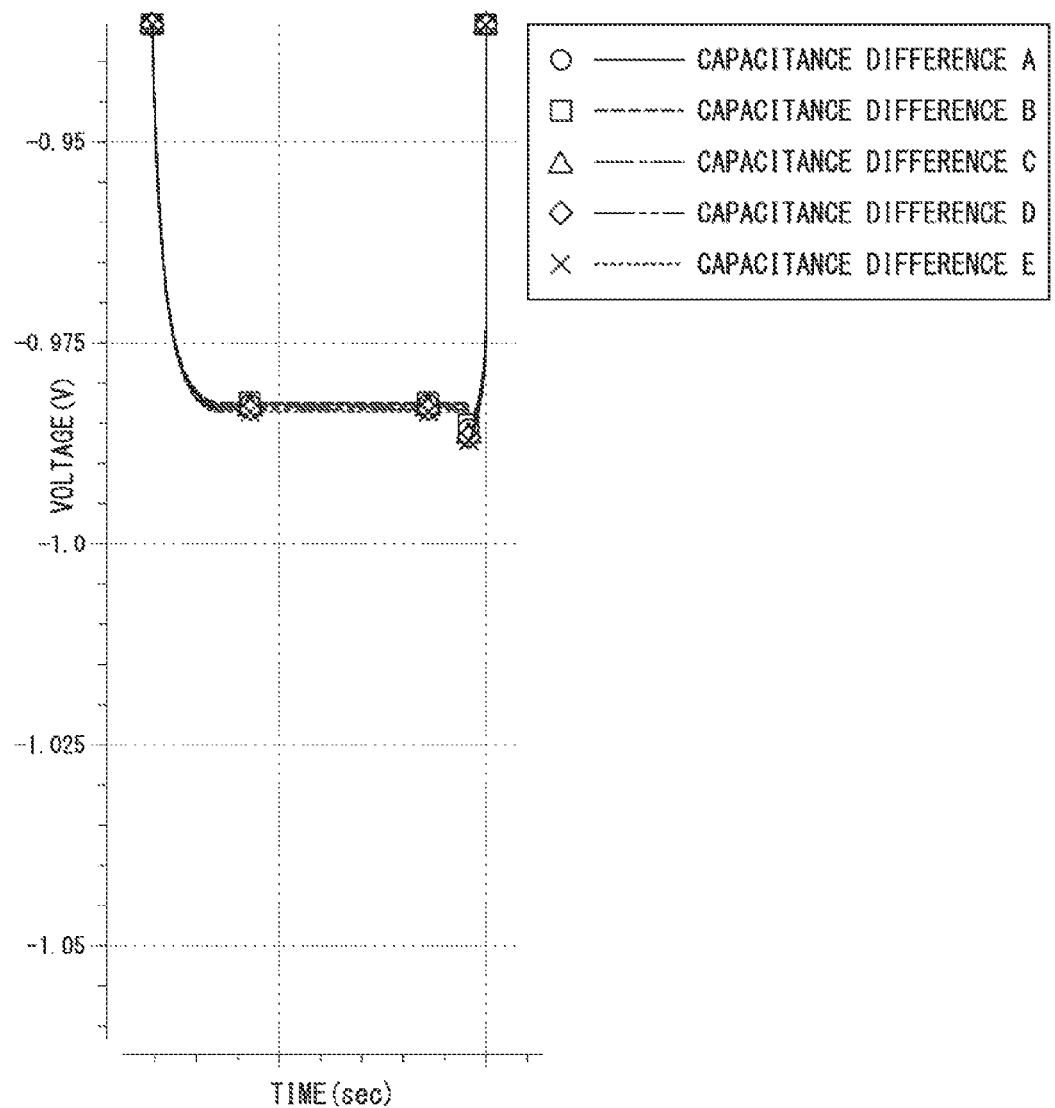
FIG. 3B is a diagram illustrating an example of the levels of signal voltages read by the signal readout circuit of the first embodiment.
Figure 9A:
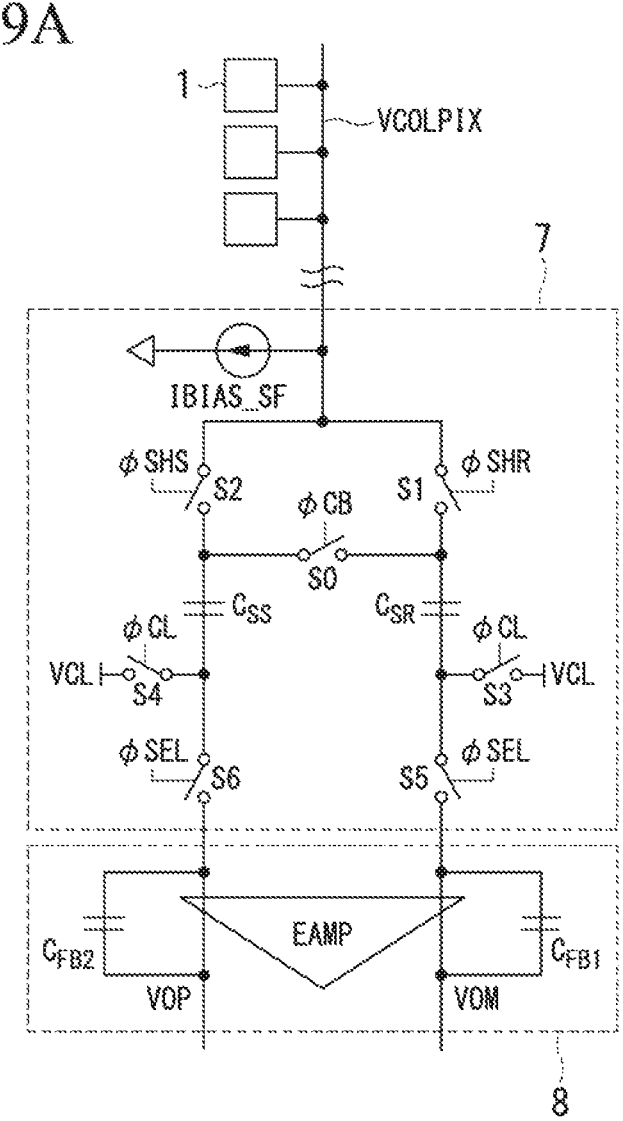
FIG. 9A is a diagram for describing a schematic configuration of a conventional signal processing circuit.
Figure 10A:
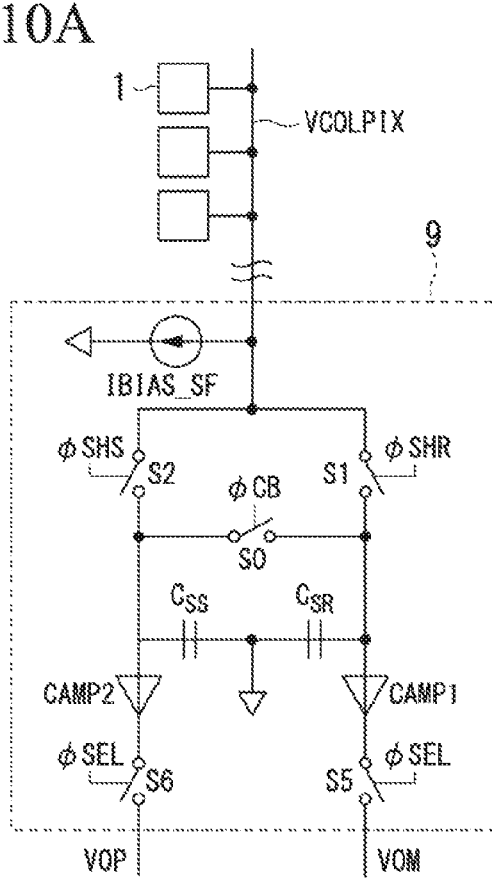
FIG. 10A is a diagram for describing a schematic configuration of another conventional signal processing circuit.
Figure 10B:
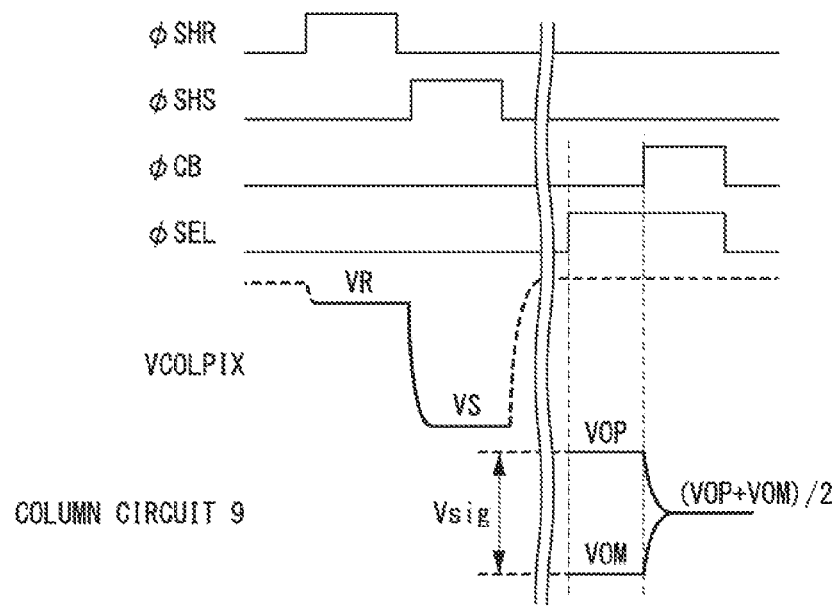
FIG. 10B is a diagram for describing an operation of another conventional signal processing circuit.

Here, an example of an actual operation of the signal readout circuit of the first embodiment capable of reading the respective signal voltages without being influenced by the difference (variation) in the capacitance value of the respective sampling capacitors and the nonlinear junction capacitance characteristics of the MOS transistors associated with the nodes connected to the respective sampling capacitors will be described. FIG. 3A is a diagram illustrating an example of the levels of the signal voltages read by the conventional signal readout circuit. FIG. 3B is a diagram illustrating an example of the levels (voltage values) of the signal voltages read by the signal readout circuit of the first embodiment. FIG. 3A illustrates an example of voltage values of the signal voltages output from the charge amplifier EAMP when a combination of the capacitance values of the respective sampling capacitors provided in the column circuit 7 of the conventional signal processing circuit illustrated in FIGS. 9A and 9B and the capacitance values of the junction capacitances of the MOS transistors associated with the nodes connected to the respective sampling capacitors is changed in five patterns. FIG. 3B illustrates an example of voltage values of the signal voltages output from the operational amplifier circuit AMP when the capacitance values of the respective sampling capacitors provided in the column circuit unit 2 of the signal readout circuit of the first embodiment and the capacitance values of the junction capacitances of the MOS transistors associated with the nodes connected to the respective sampling capacitors are varied in five patterns like the column circuit 7 provided in the conventional signal processing circuit illustrated in FIG. 3A. FIGS. 3A and 3B illustrate the level of the output reset signal voltage VOM corresponding to the same reset signal voltage VR for the respective patterns for the sake of convenience.

As can be understood from FIG. 3A, in the column circuit 7 provided in the conventional signal processing circuit, the levels (voltage values) of the reset signal voltages VOM in a period in which a constant voltage value is output for the same reset signal voltage VR are different due to a variation in the capacitance values of the sampling capacitors provided in the column circuit 7 and the capacitance values of the junction capacitances of the MOS transistors associated with the nodes connected to the respective sampling capacitors. Thus, in a CMOS image sensor in which the conventional signal processing circuit is provided in each column of a pixel array, the levels (voltage values) of the reset signal voltages VOM are different in respective columns. As a result, the difference in the level of the reset signal voltages VOM appears as new structural noise having low spatial frequency characteristics and the image quality deteriorates.

In contrast, in the signal readout circuit of the first embodiment, as can be understood from FIG. 3B, the reset signal voltages VOM of the same level (voltage value) can be output in a period in which a constant voltage value is output without being influenced by a variation in the capacitance value of the respective sampling capacitors provided in the column circuit unit 2 and the capacitance value of the junction capacitances of the MOS transistors associated with the nodes connected to the respective sampling capacitors. Thus, in a CMOS image sensor in which the signal readout circuit of the first embodiment is provided in each column of a pixel array, the levels (voltage values) of the reset signal voltage VOM are not different in respective columns and a highest effect in suppressing deterioration of the image quality is obtained. This effect is particularly remarkable in bright images.

In the signal readout circuit of the first embodiment illustrated in FIG. 1, an output common mode voltage of the operational amplifier circuit AMP which uses a fully differential amplifier is not specified. However, in the signal readout circuit of the first embodiment, the output common mode voltage is automatically adjusted by a common mode feedback circuit formed by the sampling capacitors connected to the corresponding input terminal and output terminal of the operational amplifier circuit AMP, and the output voltages (the reset voltage VOM and the optical signal voltage VOP) around the voltage level of a desired clamp voltage VCM can be output. That is, in the signal readout circuit of the first embodiment, the output voltages obtained by shifting the potential differences between the clamp voltage VCM and each of the sampled reset signal voltage VR and the sampled optical signal voltage VS to a desired voltage level (the voltage level of the clamp voltage VCM) can be output from the operational amplifier circuit AMP.

Further, the signal readout circuit of the first embodiment has an advantage that, when the signal voltages (the reset signal voltage VR and the optical signal voltage VS including the component of the reset signal voltage VR) are time-sequentially input from the pixels 1 of the corresponding column in a solid-state imaging device in which the signal readout circuit is provided in each column of a pixel array, a correlated double sampling operation can automatically be performed simultaneously with the level shift operation. This is because it is possible to obtain an effect that the difference between the reset signal voltage VR and the optical signal voltage VS is calculated by using the potential difference between the reset signal voltage VOM and the optical signal voltage VOP sequentially output from the operational amplifier circuit AMP according to the signal voltages sequentially output from the respective pixels 1.

Since the signal readout circuit of the first embodiment does not include a voltage amplifier in the column circuit unit 2 similarly to the column circuit provided in the conventional signal processing circuit, it is possible to reduce the power consumption without any increase in the power consumed by a voltage amplifier. Moreover, since the signal readout circuit of the first embodiment can increase the size of the MOS transistors that form the respective switches, it is possible to decrease the time constant represented by the product of the capacitance value of the sampling capacitor and an ON-resistance value of the MOS transistor connected to the sampling capacitor and to further reduce the power consumption. In this case, since the MOS transistor connected to the sampling capacitor has a low impedance, an effect of decreasing the impedance of a signal source to decrease random noise is also obtained.

Figure 4:
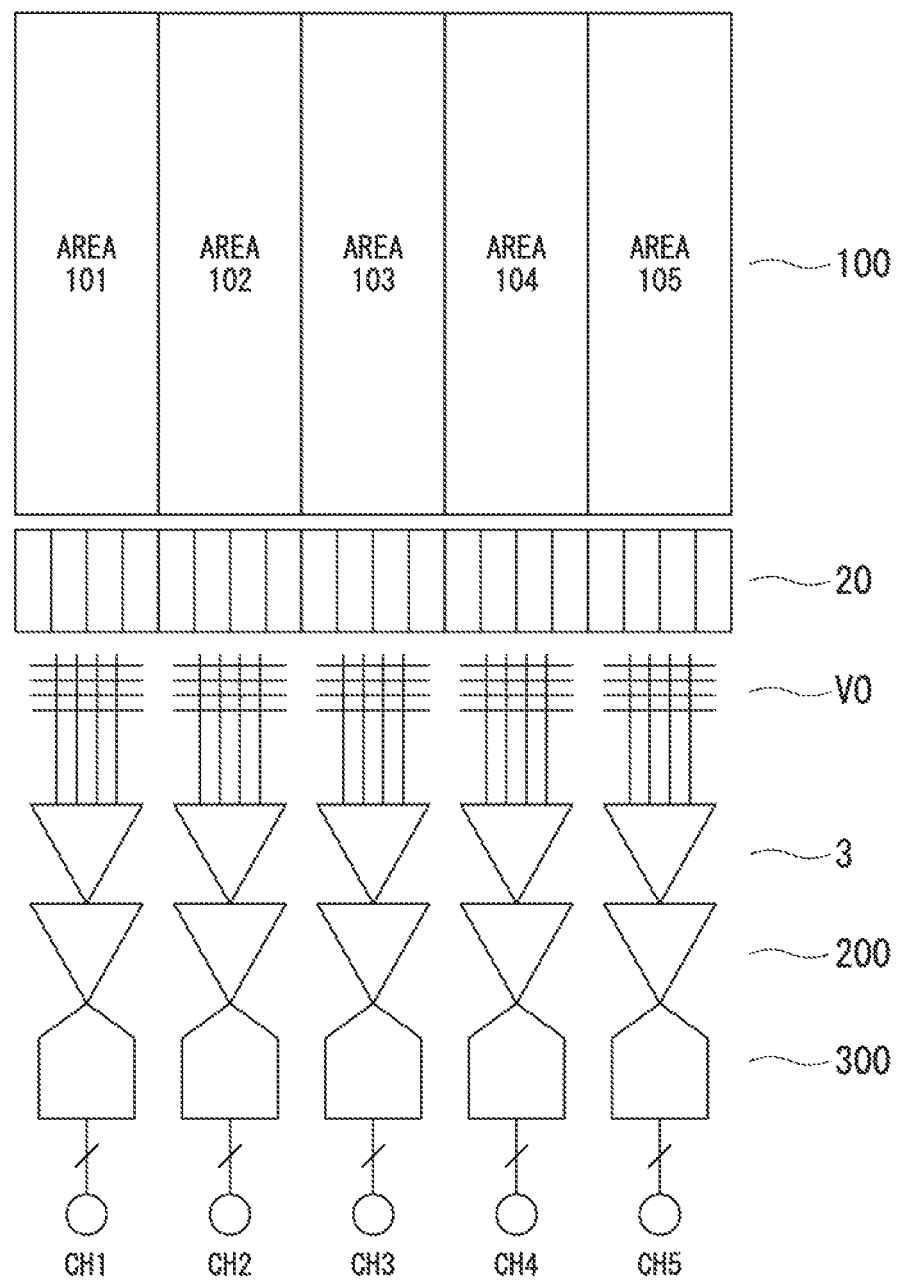
FIG. 4 is a block diagram illustrating an example of a schematic configuration of a solid-state imaging device including the signal readout circuit of the first embodiment.

Next, an example of a CMOS image sensor in which the signal readout circuit of the first embodiment is provided in each column of a pixel array will be described. FIG. 4 is a block diagram illustrating an example of a schematic configuration of a solid-state imaging device (CMOS image sensor) including the signal readout circuit of the first embodiment. The CMOS image sensor illustrated in FIG. 4 includes a pixel array 100, five column circuit groups 20, five column output line groups VO, five amplifier sections 3, five amplifier circuits 200, and five analog-to-digital (AD) converters 300. The CMOS image sensor illustrated in FIG. 4 is a configuration example of a CMOS image sensor configured so that the signal readout circuit of the first embodiment illustrated in FIG. 1 works most effectively.

The pixel array 100 is a pixel array in which a plurality of pixels 1 are disposed in a two-dimensional matrix form. The plurality of pixels 1 disposed in the pixel array 100 are virtually divided into a plurality of strip-shaped areas (in FIG. 4, five strip-shaped areas 101 to 105) corresponding to a predetermined number of columns. The CMOS image sensor illustrated in FIG. 4 is a multi-channel readout-type CMOS image sensor that reads the respective signal voltages output from the pixels 1 in the respective areas and outputs digital signals corresponding to the signal components of only subject light to which the pixels 1 are exposed from readout channels (CH1 to CH5) provided to correspond to the respective areas as image data.

The column circuit group 20 is configured such that the column circuit units 2 disposed in each column of the pixel array 100 are grouped for each area of the pixel array 100 to form one column circuit group 20.

The column output line group VO is configured such that four column output lines VO1 to VO4 corresponding to each of the column circuit units 2 disposed in each column of the pixel array 100 are grouped for each area of the pixel array 100 to form one column output line group VO. The column output line groups VO correspond to each of the column circuit groups 20, and each of the four column output lines VO1 to VO4 included in the column output line group VO is shared by all column circuit units 2 included in one corresponding column circuit group 20.

The amplifier sections 3 correspond to the respective column output line groups VO. In the CMOS image sensor illustrated in FIG. 4, one amplifier section 3 is provided in one column output line group VO. That is, the amplifier section 3 is configured such that one amplifier section 3 is shared by a plurality of column circuit units 2 that is grouped for each area of the pixel array 100. The amplifier section 3 outputs the reset voltage VOM and the optical signal voltage VOP corresponding to the respective signal voltages input via the corresponding column output line group VO to the corresponding amplifier circuit 200.

The amplifier circuit 200 extracts the signal component (analog signal) of only the subject light to which the pixels 1 are exposed based on the reset voltage VOM and the optical signal voltage VOP output from the corresponding amplifier section 3 according to a correlated double sampling (CDS) process, for example. Moreover, the amplifier circuit 200 performs amplification for applying (adjusting) a gain on the extracted signal component (analog signal) and outputs the gain-adjusted signal component (analog signal) to the corresponding AD converter 300.

The AD converter 300 is an AD converter that converts the gain-adjusted signal component (analog signal) input from the corresponding amplifier circuit 200 to a digital signal. The AD converter 300 outputs the digital signal which is AD-convened and corresponds to the signal component of only the subject light to which the pixels 1 are exposed from the corresponding readout channel as image data.

As described above, the signal readout circuit of the first embodiment can be applied to a CMOS image sensor. In the signal readout circuit of the first embodiment, unlike the above-described configuration, the column circuit unit 2 and the amplifier section 3 illustrated in FIG. 1 may not necessarily be in one-to-one correspondence. In the CMOS image sensor illustrated in FIG. 4, one readout channel that outputs the image data of one strip-shaped area includes a plurality of column circuit units 2, one column output line group VO, one amplifier section 3, one amplifier circuit 200, and one AD converter 300.

Figure 5:
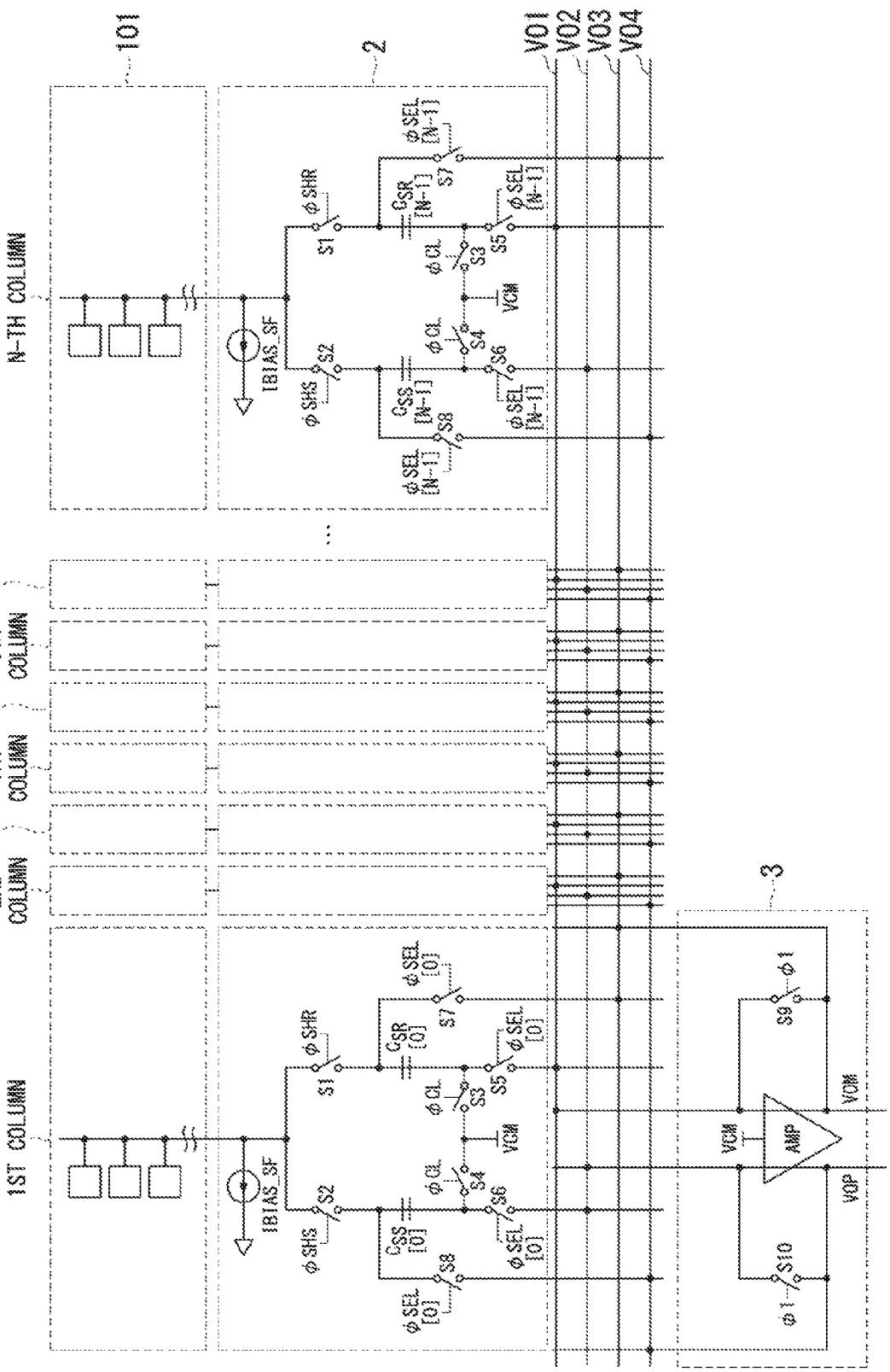
FIG. 5 is a block diagram illustrating an example of a schematic configuration of signal readout circuits corresponding to a plurality of columns of a pixel array, in the solid-state imaging device including the signal readout circuit of the first embodiment.

Next, an example of a more detailed configuration of one readout channel of the CMOS image sensor in which the signal readout circuit of the first embodiment is provided in each column of the pixel array will be described. FIG. 5 is a block diagram illustrating an example of a schematic configuration of signal readout circuits corresponding to a plurality of columns of the pixel array in a solid-state imaging device (CMOS image sensor) including the signal readout circuit of the first embodiment. FIG. 5 illustrates the configuration of the area 101 virtually divided by the N columns of pixels 1 disposed in the pixel array 100, N column circuit units 2, one column output line group VO, and one amplifier section 3 among the configurations of one readout channel CH1 that outputs the image data of one strip-shaped area 101 of the CMOS image sensor illustrated in FIG. 4.

As illustrated in FIG. 5, one column circuit unit 2 is disposed in each column of the area 101 (that is, one column circuit unit 2 is disposed in each of the first to N-th columns of the pixels 1). Moreover, the respective four column output lines VO1 to VO4 included in the column output line group VO are commonly connected to all column circuit units 2 (that is, N column circuit units 2). Moreover, one amplifier section 3 (that is, one amplifier section 3 shared by all (N) column circuit units 2) is disposed in the column output line group VO.

The select signal φSEL that controls an operation of transferring the respective signal voltages (the reset signal voltage VR and the optical signal voltage VS including the component of the reset signal voltage VR) sampled by the column circuit unit 2 to the amplifier section 3 is driven in the respective columns of the area 101. In FIG. 5, information (column number-1) indicating the column of the area 101 is allocated and inserted in the "brackets [ ]" after the signs of the select signals φSEL of the respective columns. For example, in FIG. 5, the select signal φSEL corresponding to the first column is represented by a select signal φSEL[0] and the select signal φSEL corresponding to the N-th column is represented by a select signal φSEL[N−1].

With this configuration, in the CMOS image sensor, the respective signal voltages (the reset signal voltage VR and the optical signal voltage VS including the components of the reset signal voltage VR) output from the pixels 1 and sampled by the column circuit units 2 of the respective columns are transferred to the sharing amplifier section 3 sequentially in respective columns. Moreover, the amplifier section 3 sequentially outputs the voltages (the reset signal voltage VOM and the optical signal voltage VOP) corresponding to the respective signal voltages transferred sequentially in respective columns. Moreover, the amplifier circuit 200 and the AD converter 300 process the sequentially input signals to output image data simultaneously from the respective readout channels (in FIG. 4, CH1 to CH5) corresponding to the respective areas. Thus, in the multi-channel readout-type CMOS image sensor, the image data of one frame is obtained by combining the items of image data output simultaneously from the respective readout channels. The number of columns of the image data of one frame output by the multi-channel readout-type CMOS image sensor is the product of the number of columns (N in FIG. 5) of the pixels 1 included in the respective strip-shaped areas that virtually divide the pixel array 100 provided in the CMOS image sensor and the number ("5" in FIG. 4) of readout channels that output the image data simultaneously from the CMOS image sensor.

Figure 6:
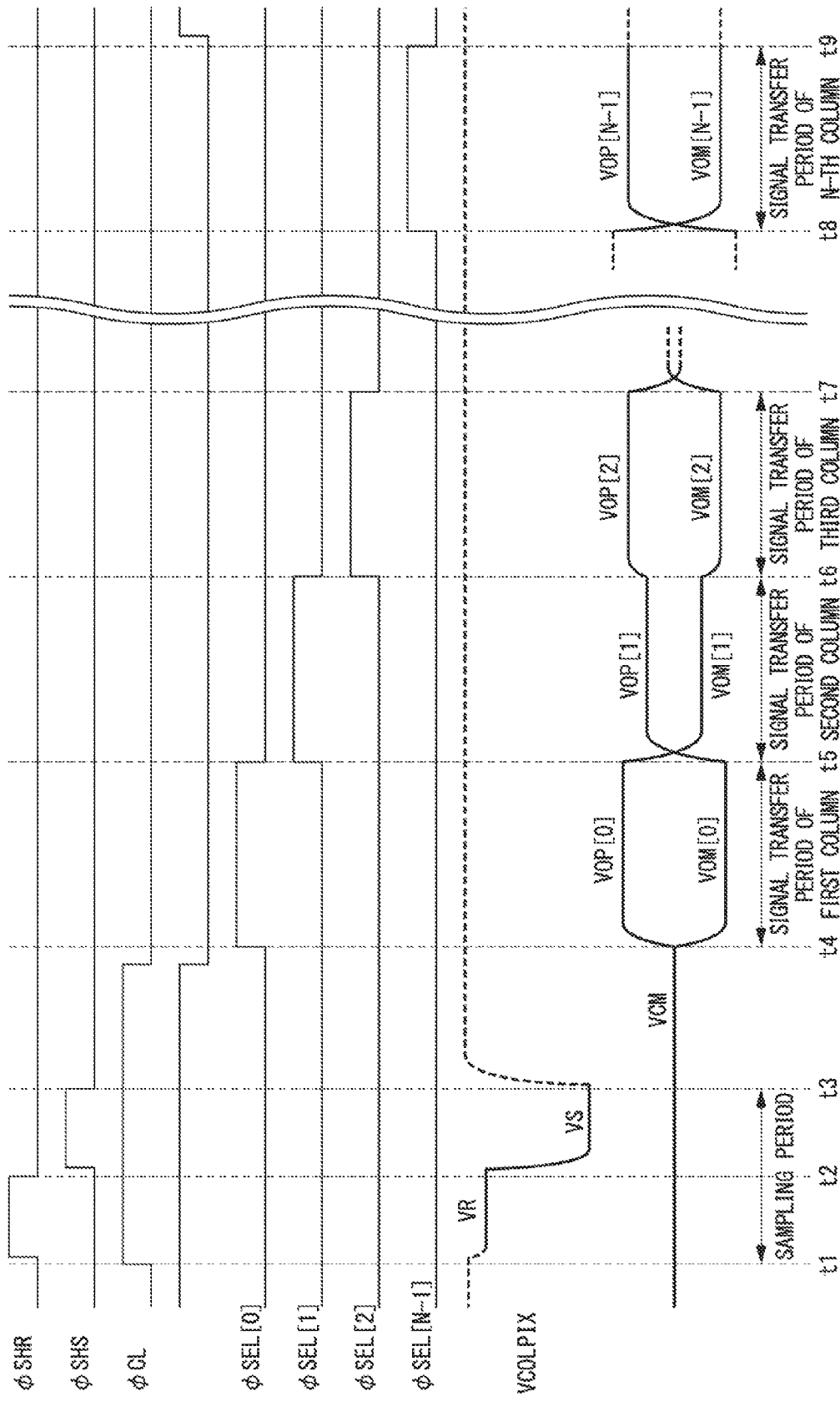
FIG. 6 is a timing chart illustrating an example of signal readout timings of the signal readout circuits corresponding to the plurality of columns of a pixel array, in the solid-state imaging device including the signal readout circuit of the first embodiment.

Next, the operation timings of the CMOS image sensor in which the signal readout circuit of the first embodiment is provided in each column of the pixel array will be described. FIG. 6 is a timing chart illustrating an example of the timings at which the signal readout circuits corresponding to the plurality of columns of the pixel array 100 read signals in the solid-state imaging device (CMOS image sensor) including the signal readout circuit of the first embodiment. FIG. 6 illustrates an example of the operation timings in a configuration of one readout channel CH1 that reads the respective signal voltages of the area 101 illustrated in FIG. 5, in which the reset signal voltage VR and the optical signal voltage VS output from the pixels 1 of the same one row are sampled to output the reset signal voltage VOM having the potential corresponding to the reset signal voltage VR and the optical signal voltage VOP having the potential corresponding to the optical signal voltage VS. That is, the signal readout timings illustrated in FIG. 6 are the operation timings of one readout channel in the configuration of the CMOS image sensor illustrated in FIG. 4, at which the respective signal voltages corresponding to one row are read from the pixels 1 and output to the amplifier circuit 200 of the subsequent stage.

In the following description, in order to clarify the correspondence of the area 101 to respective columns, information (column number-1) indicating the column of the corresponding area 101 is allocated and inserted in the "brackets [ ]" after the signs of the signal voltages and the constituent elements in the column circuit units 2 corresponding to the respective columns.

In the CMOS image sensor, first, in the sampling period, the column circuit unit 2 corresponding to each of the respective columns of the pixels 1 on the same row provided in the area 101 samples the reset signal voltage VR and the optical signal voltage VS input via the pixel output line VCOLPIX. The driving signal φ1 is set to the "High" level before the sampling period starts so that the switches S9 and S10 in the amplifier section 3 shared by the column circuit units 2 of all columns enter the ON state and the operational amplifier circuit AMP in the amplifier section 3 is held in the initialized state. As a result, the potential of the clamp voltage VCM is output from the respective output terminals of the operational amplifier circuit AMP.

In the sampling period, at time t1, the clamp signals φCL of all column circuit units 2 are set to the "High" level so that the switches S3 and S4 in the respective column circuit units 2 enter the ON state and the other terminal of the sampling capacitor $C_{SR}$ in the respective column circuit units 2 and the other terminal of the sampling capacitor $C_{SS}$ are short-circuited to the clamp voltage VCM. That is, a state in which the sampling capacitor $C_{SR}$ and the sampling capacitor $C_{SS}$ in all column circuit units 2 are clamped by the clamp voltage VCM is created.

After that, the sampling signals φSHR of all column circuit units 2 are set to the "High" level so that the reset signal voltages VR input from the corresponding pixels 1 via the corresponding pixel output lines VCOLPIX are input to one set of terminals of the sampling capacitors $C_{SR}$ in the respective column circuit units 2. At time t2, the potential of the reset signal voltage VR is sampled to the sampling capacitors $C_{SR}$ in the respective column circuit units 2.

After that, the sampling signal φSHR is set to the "Low" level so that the input of the respective reset signal voltages VR to one terminal of the sampling capacitor $C_{SR}$ is stopped in all column circuit units 2. After that, the sampling signals φSHS of all column circuit units 2 are set to the "High" level so that the respective optical signal voltages VS input from the corresponding pixels 1 via the corresponding pixel output lines VCOLPIX are input to one set of terminals of the sampling capacitors $C_{SS}$ in the respective column circuit units 2. At time t3, the potential of the corresponding optical signal voltage VS is sampled to the sampling capacitors $C_{SS}$ in the respective column circuit units 2.

After that, the sampling signal φSHS is set to the "Low" level so that the input of the respective optical signal voltage VS to one terminal of the sampling capacitor $C_{SS}$ is stopped in all column circuit units 2. After that, the respective signal voltages sampled by the respective column circuit units 2 are held for a predetermined period. That is, after the sampling period in which the respective column circuit units 2 sample the reset signal voltage VR and the optical signal voltage VS to the sampling capacitor $C_{SR}$ and the sampling capacitor $C_{SS}$, respectively, ends, the respective signal voltages sampled by the respective column circuit units 2 are held for the predetermined period. After the predetermined period ends, the respective signal voltages sampled by the respective column circuit units 2 are sequentially transferred to the operational amplifier circuit AMP in the amplifier section 3 shared by the column circuit units 2 of all columns in the signal transfer period.

The clamp signal φCL is set to the "Low" level before the signal transfer period starts so that the switches S3 and S4 in all column circuit units 2 enter the OFF state and the short-circuiting to the clamp voltage VCM of the other sets of terminals of the sampling capacitors $C_{SR}$ and $C_{SS}$ in the respective column circuit units 2 is stopped. Moreover, the driving signal φ1 is set to the "Low" level so that the switches S9 and S10 in the amplifier section 3 shared by the respective column circuit units 2 enter the OFF state and the initialization of the operational amplifier circuit AMP in the amplifier section 3 is released.

In the signal transfer period, after time t4, the transfer of the respective sampled signal voltages to the amplifier section 3 from the column circuit unit 2 corresponding to the first column of the area 101 starts. First, at time t4, the select signal φSEL[0] of the column circuit unit 2 corresponding to the first column of the area 101 is set to the "High" level. As a result, when the switch S5[0] in the column circuit unit 2 of the first column enters the ON state, the other terminal of the sampling capacitor $C_{SR}$[0] in the column circuit unit 2 of the first column and one input terminal of the operational amplifier circuit AMP in the amplifier section 3 are connected via the column output line VO1. Moreover, when the switch S7[0] in the column circuit unit 2 of the first column enters the ON state, one terminal of the sampling capacitor $C_{SR}$[0] in the column circuit unit 2 of the first column and one output terminal of the operational amplifier circuit AMP in the amplifier section 3 are connected via the column output line VO3. With this connection, the sampling capacitor $C_{SR}$[0] operates as a feedback capacitor disposed between one input terminal of the operational amplifier circuit AMP and one output terminal thereof. Moreover, the potential of the reset signal voltage VR[0] sampled to the sampling capacitor $C_{SR}$[0] is input (transferred) to one input terminal of the operational amplifier circuit AMP via the column output line VO1. The reset signal voltage VR[0] input to one input terminal (that is, the reset signal voltage VOM[0] having the potential proportional to the potential of the reset signal voltage VR[0] sampled to the sampling capacitor $C_{SR}$[0]) is output from one output terminal of the operational amplifier circuit AMP. Moreover, the reset signal voltage VOM[0] output from one output terminal of the operational amplifier circuit AMP is also input to one terminal of the sampling capacitor $C_{SR}$[0] via the column output line VO3.

When the switch S6[0] in the column circuit unit 2 of the first column enters the ON state, the other terminal of the sampling capacitor $C_{SS}$[0] in the column circuit unit 2 of the first column and the other input terminal of the operational amplifier circuit AMP in the amplifier section 3 are connected via the column output line VO2. Moreover, when the switch S8[0] in the column circuit unit 2 of the first column enters the ON state, one terminal of the sampling capacitor $C_{SS}$[0] in the column circuit unit 2 of the first column and the other output terminal of the operational amplifier circuit AMP in the amplifier section 3 are connected via the column output line VO4. With this connection, the sampling capacitor $C_{SR}$[0] operates as a feedback capacitor disposed between the other input terminal of the operational amplifier circuit AMP and the other output terminal thereof. Moreover, the potential of the optical signal voltage VS[0] sampled to the sampling capacitor $C_{SS}$[0] is input (transferred) to the other input terminal of the operational amplifier circuit AMP via the column output line VO2. The optical signal voltage VS[0] input to the other input terminal (that is, the optical signal voltage VOP[0] having the potential proportional to the potential of the optical signal voltage VS[0] sampled to the sampling capacitor $C_{SS}$[0]) is output from the other output terminal of the operational amplifier circuit AMP. Moreover, the optical signal voltage VOP[0] output from the other output terminal of the operational amplifier circuit AMP is also input to one terminal of the sampling capacitor $C_{SS}$[0] via the column output line VO4.

After that, at time t5, the select signal φSEL[0] of the column circuit unit 2 corresponding to the first column of the area 101 is set to the "Low" level so that the transfer (the signal transfer period of the first column) to the operational amplifier circuit AMP, of the reset signal voltage VR[0] and the optical signal voltage VS[0] sampled to the sampling capacitors $C_{SR}$[0] and $C_{SS}$[0] in the column circuit unit 2 of the first column stops. The amplifier circuit 200 on the subsequent stage performs an operation of calculating the difference between the reset signal voltage VOM[0] output from one output terminal of the operational amplifier circuit AMP and the optical signal voltage VOP[0] output from the other output terminal thereof whereby the signal component Vsig[0] of only subject light to which the pixels 1 of the first column of the area 101 are exposed can be obtained.

Subsequently, the select signal φSEL[1] of the column circuit unit 2 corresponding to the second column of the area 101 is set to the "High" level. As a result, when the switch S5[1] in the column circuit unit 2 of the second column enters the ON state, the other terminal of the sampling capacitor $C_{SR}$[1] in the column circuit unit 2 of the second column and one input terminal of the operational amplifier circuit AMP in the amplifier section 3 are connected via the column output line VO1. Moreover, when the switch S7[1] in the column circuit unit 2 of the second column enters the ON state, one terminal of the sampling capacitor $C_{SR}$[1] in the column circuit unit 2 of the second column and one output terminal of the operational amplifier circuit AMP in the amplifier section 3 are connected via the column output line VO3. With this connection, the sampling capacitor $C_{SR}$[1] operates as a feedback capacitor disposed between one input terminal of the operational amplifier circuit AMP and one output terminal thereof. Moreover, the potential of the reset signal voltage VR[1] sampled to the sampling capacitor $C_{SR}$[1] is input (transferred) to one input terminal of the operational amplifier circuit AMP via the column output line VO1. The reset signal voltage VR[1] input to one input terminal (that is, the reset signal voltage VOM[1] having the potential proportional to the potential of the reset signal voltage VR[1] sampled to the sampling capacitor $C_{SR}$[1]) is output from one output terminal of the operational amplifier circuit AMP. Moreover, the reset signal voltage VOM[1] output from one output terminal of the operational amplifier circuit AMP is also input to one terminal of the sampling capacitor $C_{SR}$[1] via the column output line VO3.

When the switch S6[1] in the column circuit unit 2 of the second column enters the ON state, the other terminal of the sampling capacitor $C_{SS}$[1] in the column circuit unit 2 of the second column and the other input terminal of the operational amplifier circuit AMP in the amplifier section 3 are connected via the column output line VO2. Moreover, when the switch S8[1] in the column circuit unit 2 of the second column enters the ON state, one terminal of the sampling capacitor $C_{SS}$[1] in the column circuit unit 2 of the second column and the other output terminal of the operational amplifier circuit AMP in the amplifier section 3 are connected via the column output line VO4. With this connection, the sampling capacitor $C_{SR}$[1] operates as a feedback capacitor disposed between the other input terminal of the operational amplifier circuit AMP and the other output terminal thereof. Moreover, the potential of the optical signal voltage VS[1] sampled to the sampling capacitor $C_{SS}$[1] is input (transferred) to the other input terminal of the operational amplifier circuit AMP via the column output line VO2. The optical signal voltage VS[1] input to the other input terminal (that is, the optical signal voltage VOP[1] having the potential proportional to the potential of the optical signal voltage VS[1] sampled to the sampling capacitor $C_{SS}$[1]) is output from the other output terminal of the operational amplifier circuit AMP. Moreover, the optical signal voltage VOP[1] output from the other output terminal of the operational amplifier circuit AMP is also input to one terminal of the sampling capacitor $C_{SS}$[1] via the column output line VO4.

After that, at time t6, the select signal φSEL[1] of the column circuit unit 2 corresponding to the second column of the area 101 is set to the "Low" level so that the transfer (the signal transfer period of the second column) to the operational amplifier circuit AMP of the reset signal voltage VR[1] and the optical signal voltage VS[1] sampled to the sampling capacitors $C_{SR}$[1] and $C_{SS}$[1] in the column circuit unit 2 of the second column stops. The amplifier circuit 200 on the subsequent stage performs an operation of calculating the difference between the reset signal voltage VOM[1] output from one output terminal of the operational amplifier circuit AMP and the optical signal voltage VOP[1] output from the other output terminal thereof whereby the signal component Vsig[1] of only subject light to which the pixels 1 of the second column of the area 101 are exposed can be obtained.

After that, similarly, the select signals φSEL[2] to φSEL[N−1] of the column circuit units 2 corresponding to the third to N-th columns of the area 101 are sequentially set to the "High" level. As a result, the sampling capacitors $C_{SR}$[2] to $C_{SR}$[N−1] in the column circuit units 2 of the third to N-th columns sequentially operate as the feedback capacitors disposed between one input terminal of the operational amplifier circuit AMP and one output terminal thereof. As a result, the reset signal voltages VR[2] to VR[N−1] input to one input terminal (that is, the reset signal voltages VOM[2] to VOM[N−1] having the potentials proportional to the potentials of the reset signal voltages VR[2] to VR[N−1] sampled to the sampling capacitors $C_{SR}$[2] to $C_{SR}$[N−1]) are sequentially output from one output terminal of the operational amplifier circuit AMP.

Moreover, similarly, the sampling capacitors $C_{SS}$[2] to $C_{SS}$[N−1] in the column circuit units 2 of the third to N-th columns sequentially operate as the feedback capacitors disposed between the other input terminal of the operational amplifier circuit AMP and the other output terminal thereof. As a result, the optical signal voltages VS[2] to VS[N−1] input to the other input terminal (that is, the optical signal voltages VOP[2] to VOP[N−1] having the potentials proportional to the potentials of the optical signal voltages VS[2] to VS[N−1] sampled to the sampling capacitors $C_{SS}$[2] to $C_{SS}$[N−1]) are sequentially output from the other output terminal of the operational amplifier circuit AMP.

Finally, at time t9, the select signal φSEL[N−1] of the column circuit unit 2 corresponding to the N-th column of the area 101 is set to the "Low" level so that the transfer (the signal transfer period of the N-th column) to the operational amplifier circuit AMP, of the reset signal voltage VR[N−1] and the optical signal voltage VS[N−1] sampled to the sampling capacitors $C_{SR}$[N−1] and $C_{SS}$[N−1] in the column circuit unit 2 of the N-th column stops. The amplifier circuit 200 on the subsequent stage performs an operation of calculating the difference between the reset signal voltage VOM[2] to VOM[N−1] output from one output terminal of the operational amplifier circuit AMP and the optical signal voltage VOP[2] to VOP[N−1] output from the other output terminal thereof whereby the signal component Vsig[2] to Vsig[N−1] of only subject light to which the pixels 1 of the third to N-th column of the area 101 are exposed can be obtained. After the transfer of the respective sampled signal voltages to the operational amplifier circuit AMP ends, the driving signal φ1 may be set to the "High" level so that the switches S9 and S10 in the amplifier section 3 shared by the column circuit units 2 of all columns enter the ON state and the operational amplifier circuit AMP is initialized again.

In this way, the CMOS image sensor reads the respective signal voltages output from the pixels 1 of one row. After that, similarly, the reset signal voltage VR and the optical signal voltage VS output from the pixels 1 of the next one row to the pixel output line VCOLPIX are sampled, and the reset signal voltage VOM having the potential corresponding to the reset signal voltage VR and the optical signal voltage VOP having the potential corresponding to the optical signal voltage VS are output to the amplifier circuit 200 of the subsequent stage. When the reading of signals from the pixels 1 of all rows of the pixel array 100 ends, the output of image data of one frame of the CMOS image sensor is completed.

The first embodiment provides a signal readout circuit including: a first capacitor (the sampling capacitor $C_{SR}$) that holds a first electric charge (an electric charge corresponding to the potential of the reset signal voltage VR); a second capacitor (the sampling capacitor $C_{SS}$) that holds a second electric charge (an electric charge corresponding to the potential of the optical signal voltage VS); an amplifier section 3 having an amplifier (the operational amplifier circuit AMP), the amplifier outputting a first potential input to a first input terminal (one input terminal) to a first output terminal (the other output terminal) with a gain of "1" (gain=1) and outputting a second potential input to a second input terminal (the other input terminal) to a second output terminal (the other output terminal) with a gain of "1" (gain=1); and a switch circuit (the switches S1 to S8, the switch S9, and the switch S10) that switches on/off state of a connection of the first or second terminal (one terminal or the other terminal) of the sampling capacitor $C_{SR}$ or $C_{SS}$ with at least one of the input terminals (one input terminal and the other input terminal) and the output terminals (one output terminal and the other output terminal) of the operational amplifier circuit AMP, wherein a difference between the electric charge corresponding to the potential of the reset signal voltage VR and the electric charge corresponding to the potential of the optical signal voltage VS is an amount indicating a voltage value of a predetermined voltage signal (the signal component Vsig). An electric charge corresponding to the potential of the reset signal voltage VR is held in the sampling capacitor $C_{SR}$ and an electric charge corresponding to the potential of the optical signal voltage VS is held in the sampling capacitor $C_{SS}$ when the switch circuit (the switches S1 to S10) is in a first state (the state in the sampling period). When the switch circuit (the switches S1 to S10) is in a second state (the state in the signal transfer period), the connections of the respective terminals is switched so that the sampling capacitor $C_{SR}$ is connected between one input terminal of the operational amplifier circuit AMP and the other output terminal thereof, and the sampling capacitor $C_{SS}$ is connected between the other input terminal of the operational amplifier circuit AMP and the other output terminal thereof.

The first embodiment also provides a method for controlling the signal readout circuit of the first embodiment including: a first capacitor (the sampling capacitor $C_{SR}$) that holds a first electric charge (an electric charge corresponding to the potential of the reset signal voltage VR); a second capacitor (the sampling capacitor $C_{SS}$) that holds a second electric charge (an electric charge corresponding to the potential of the optical signal voltage VS); an amplifier section 3 having an amplifier (the operational amplifier circuit AMP), the amplifier outputting a first potential input to a first input terminal (one input terminal) to a first output terminal (the other output terminal) with a gain of "1" (gain=1) and outputting a second potential input to a second input terminal (the other input terminal) to a second output terminal (the other output terminal) with a gain of "1" (gain=1); and a switch circuit (the switches S1 to S8, the switch S9, and the switch S10) that switches on/off state of a connection of the first or second terminal (one terminal or the other terminal) of the sampling capacitor $C_{SR}$ or $C_{SS}$ with at least one of the input terminals (one input terminal and the other input terminal) and the output terminals (one output terminal and the other output terminal) of the operational amplifier circuit AMP, wherein a difference between the electric charge corresponding to the potential of the reset signal voltage VR and the electric charge corresponding to the potential of the optical signal voltage VS is an amount indicating a voltage value of a predetermined voltage signal (the signal component Vsig). The method includes: a first state (the state in the sampling period) of the switch circuit (the switches S1 to S10) in which an electric charge corresponding to the potential of the reset signal voltage VR is held in the sampling capacitor $C_{SR}$ and an electric charge corresponding to the potential of the optical signal voltage VS is held in the sampling capacitor $C_{SS}$; and a second state (the state in the signal transfer period) of the switch circuit (the switches S1 to S10) in which the switch circuit (the switches S1 to S10) switches the connections of the respective terminals so that the sampling capacitor $C_{SR}$ is connected between one input terminal of the operational amplifier circuit AMP and the other output terminal thereof, and the sampling capacitor $C_{SS}$ is connected between the other input terminal of the operational amplifier circuit AMP and the other output terminal thereof.

In the signal readout circuit of the first embodiment, the electric charge corresponding to the potential of the reset signal voltage VR is an amount of electric charge corresponding to the potential of a reset signal (the reference voltage=the reset signal voltage VR) which is output from a pixel section (the pixel array 100) in which a plurality of pixels 1 are disposed in a two-dimensional matrix form and which is generated when a physical amount is not incident on each of the plurality of pixels 1 disposed in the pixel array 100. The electric charge corresponding to the potential of the optical signal voltage VS is an amount of electric charge corresponding to the sum of the potential of a reset signal (the reference voltage=the reset signal voltage VR) and the potential of a pixel signal (the signal component=the signal component Vsig) which is output from the pixel array 100 and which is generated according to the physical amount incident on each of the plurality of pixels 1 disposed in the pixel array 100. The sampling capacitor $C_{SR}$ and the sampling capacitor $C_{SS}$ are disposed in each column of the plurality of pixels 1 disposed in the pixel array 100.

In the signal readout circuit of the first embodiment, the amplifier section 3 is disposed in strip-shaped areas (the areas 101 to 105) corresponding to a plurality of columns of the plurality of pixels 1 disposed in the pixel array 100.

As described above, when the signal readout circuit of the first embodiment is provided in each column of a pixel array provided in a CMOS image sensor, the reset voltage VOM and the optical signal voltage VOP corresponding to the respective signal voltages output from the corresponding pixels 1 can be output to the corresponding amplifier circuit 200. In this case, since the signal readout circuit of the first embodiment is not influenced by the difference (variation) in the capacitance value of the two sampling capacitors (the sampling capacitors $C_{SR}$ and $C_{SS}$) in the column circuit units 2 corresponding to the respective columns, it is possible to reduce the layout area of the respective sampling capacitors. As a result, it is possible to reduce the area occupied by the respective column circuit units 2 provided in the chip of the CMOS image sensor and to reduce the chip area of the CMOS image sensor.

The signal readout circuit of the first embodiment reads the respective signal voltages input from the pixels 1 directly as voltages, unlike the column circuit provided in the conventional signal processing circuit. Thus, even when a plurality of column circuit units 2 share one amplifier section 3, the difference (variation) in the capacitance value of the sampling capacitors of the column circuit units 2 will not influence the reset voltage VOM and the optical signal voltage VOP output by one operational amplifier circuit AMP. That is, the respective signal voltages can be read without being influenced by the difference (variation) in the capacitance value of the sampling capacitors of different column circuit units 2. As a result, since the CMOS image sensor includes only one amplifier section 3, it is possible to reduce the chip area of the CMOS image sensor and to improve the readout accuracy when reading the signal voltages output by the respective pixels 1.

The signal readout circuit of the first embodiment does not include the voltage amplifier in the column circuit unit 2 unlike the column circuit provided in the conventional signal processing circuit. As a result, it is possible to reduce the power consumption of the CMOS image sensor without any increase in the power consumption resulting from the voltage amplifier.

In the CMOS image sensor illustrated in FIGS. 5 and 6, a case in which the column circuit units 2 corresponding to the respective columns of the area 101 simultaneously sample the reset signal voltage VR and the optical signal voltage VS input via the corresponding pixel output lines VCOLPIX from the pixels 1 of the same row in the sampling period has been described. That is, a case in which the clamp signal φCL, the sampling signal φSHR, and the sampling signal φSHS are common to all column circuit units 2 has been described. However, a CMOS image sensor in which the signal readout circuit of the first embodiment is provided in each column of the pixel array is not limited to the configuration and the operation of the CMOS image sensor illustrated in FIGS. 5 and 6. For example, a CMOS image sensor in which the reset signal voltage VR and the optical signal voltage VS are also sequentially sampled in respective columns can be realized by allowing the clamp signal φCL, the sampling signal φSHR, and the sampling signal φSHS to be driven in the respective columns of the area 101 similarly to the select signal φSEL.

When the signal readout circuit of the first embodiment is provided in each column of the pixel array and the plurality of column circuit units 2 are shared by one amplifier section 3 like the CMOS image sensor illustrated in FIGS. 4 and 5, the signal voltages can be read with higher accuracy if the influence of parasitic capacitors in the four column output lines VO1 to VO4 is taken into consideration. This is because the capacitance values of the parasitic capacitors in the four column output lines VO1 to VO4 may be substantially different in the respective columns of the pixel array depending on the distance corresponding to the arrangement positions of the column circuit units 2 and the amplifier sections 3 in the CMOS image sensor chip. Thus, when the influence of the difference in the capacitance value of the parasitic capacitors in the four column output lines VO1 to VO4 is large, it is desirable to be able to correct (cancel) the influence.

Second Embodiment

Figure 7:
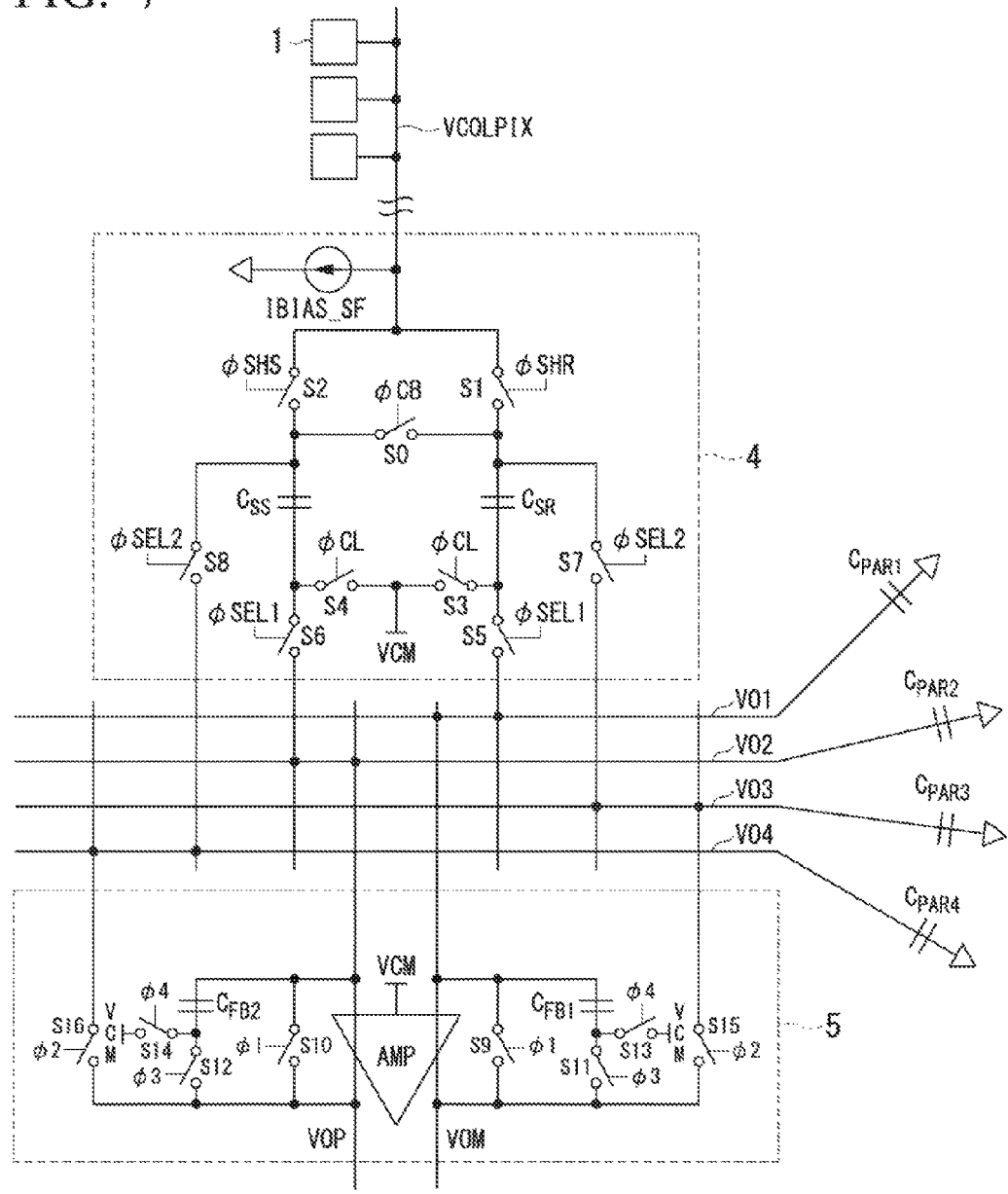
FIG. 7 is a circuit diagram illustrating a schematic configuration of a signal readout circuit according to a second embodiment of the present invention.

Next, a second embodiment of the present invention will be described. FIG. 7 is a circuit diagram illustrating a schematic configuration of a signal readout circuit according to the second embodiment. The signal readout circuit of the second embodiment illustrated in FIG. 7 includes a column circuit unit 4, four column output lines VO1 to VO4, and an amplifier section 5. FIG. 7 also illustrates a pixel section made up of three pixels 1 disposed on the same column, which outputs signal voltages to the column circuit unit 4 provided in the signal readout circuit of the second embodiment via a pixel output line VCOLPIX. The signal readout circuit of the second embodiment is a signal readout circuit configured to convert the signal voltages output from the respective pixels 1 to electric charges, then convert the electric charges to voltages, and read the voltages unlike the signal readout circuit of the first embodiment. In description of the signal readout circuit of the second embodiment, constituent elements having the same functions as those of the signal readout circuit of the first embodiment will be denoted by the same reference numerals.

The column circuit unit 4 stores (samples) an electric charge corresponding to a potential difference between the clamp voltage VCM and the signal voltage output from any one of the pixels 1 in the pixel section via the pixel output line VCOLPIX as a voltage. The column circuit unit 4 includes a constant current circuit IBIAS_SF, a sampling capacitor $C_{SR}$, a sampling capacitor $C_{SS}$, and switches S0 to S8.

The constant current circuit IBIAS_SF is a constant current source of which one end is connected to the pixel output line VCOLPIX and the other end is connected to the ground of the column circuit unit 4. The constant current circuit IBIAS_SF supplies a constant current to the pixel output line VCOLPIX to bias a signal voltage output amplifier in the pixel 1 that outputs the signal voltage.

The sampling capacitor $C_{SR}$ is a capacitor that samples and holds an electric charge corresponding to the reset signal voltage VR which is a reference voltage serving as the reference of the signal voltage output by the pixel 1.

The sampling capacitor $C_{SS}$ is a capacitor that samples and holds an electric charge corresponding to the optical signal voltage VS which is a signal component of the signal voltage output by the pixel 1. The optical signal voltage VS also includes an electric charge component of the reset signal voltage VR generated after pixels are reset.

The switch S1 is a switch that selects the reset signal voltage VR input from the pixel 1 via the pixel output line VCOLPIX and connects a signal line connected to the pixel output line VCOLPIX and one terminal of the sampling capacitor $C_{SR}$ according to a sampling signal φSHR.

The switch S2 is a switch that selects the optical signal voltage VS input from the pixel 1 via the pixel output line VCOLPIX and connects the signal line connected to the pixel output line VCOLPIX and one terminal of the sampling capacitor $C_{SS}$ according to a sampling signal φSHS.

The switch S3 is a switch that connects the other terminal of the sampling capacitor $C_{SR}$ and the clamp voltage VCM when the column circuit unit 4 performs an operation of sampling the reset signal voltage VR, and allows the other terminal of the sampling capacitor $C_{SR}$ to be short-circuited to the clamp voltage VCM according to a clamp signal φCL.

The switch S4 is a switch that connects the other terminal of the sampling capacitor $C_{SS}$ and the clamp voltage VCM when the column circuit unit 4 performs an operation of sampling the optical signal voltage VS, and allows the other terminal of the sampling capacitor $C_{SS}$ to be short-circuited to the clamp voltage VCM according to the clamp signal φCL.

The switch S0 is a switch that connects one terminal of the sampling capacitor $C_{SR}$ and one terminal of the sampling capacitor $C_{SS}$ when the column circuit unit 4 performs an operation of transferring the reset signal voltage VR sampled to the sampling capacitor $C_{SR}$ and the optical signal voltage VS sampled to the sampling capacitor $C_{SS}$ to the amplifier section 5, and allows the nodes (sampling nodes) of one set of terminals of the two sampling capacitors to be short-circuited according to a driving signal φCB.

The switch S5 is a switch that connects the other terminal of the sampling capacitor $C_{SR}$ and the column output line VO1 when the column circuit unit 4 performs an operation of transferring the reset signal voltage VR sampled to the sampling capacitor $C_{SR}$ to the amplifier section 5, and allows the other terminal of the sampling capacitor $C_{SR}$ to be short-circuited to a signal line connected to the column output line VO1 according to a first select signal φSEL1. When the other terminal of the sampling capacitor $C_{SR}$ and the column output line VO1 are connected by the switch S5, the reset signal voltage VR sampled to the sampling capacitor $C_{SR}$ is input to one amplifier input terminal of the amplifier section 5 via the column output line VO1.

The switch S6 is a switch that connects the other terminal of the sampling capacitor $C_{SS}$ and the column output line VO2 when the column circuit unit 4 performs an operation of transferring the optical signal voltage VS sampled to the sampling capacitor $C_{SS}$ to the amplifier section 5, and allows the other terminal of the sampling capacitor $C_{SS}$ to be short-circuited to a signal line connected to the column output line VO2 according to the first select signal φSEL1. When the other terminal of the sampling capacitor $C_{SS}$ and the column output line VO2 are connected by the switch S6, the optical signal voltage VS sampled to the sampling capacitor $C_{SS}$ is input to the other amplifier input terminal of the amplifier section 5 via the column output line VO2.

The switch S7 is a switch that connects one terminal of the sampling capacitor $C_{SR}$ and the column output line VO3 when the column circuit unit 4 performs an operation of transferring the reset signal voltage VR sampled to the sampling capacitor $C_{SR}$ to the amplifier section 5, and allows one terminal of the sampling capacitor $C_{SR}$ to be short-circuited to a signal line connected to the column output line VO3 according to a second select signal φSEL2. When one terminal of the sampling capacitor $C_{SR}$ and the column output line VO3 are connected by the switch S7, a voltage VOM output from one amplifier output terminal of the amplifier section 5 is input to one terminal of the sampling capacitor $C_{SR}$ via the column output line VO3 and a switch S15 in the amplifier section 5.

The switch S8 is a switch that connects one terminal of the sampling capacitor $C_{SS}$ and the column output line VO4 when the column circuit unit 4 performs an operation of transferring the optical signal voltage VS sampled to the sampling capacitor $C_{SS}$ to the amplifier section 5, and allows one terminal of the sampling capacitor $C_{SS}$ to be short-circuited to a signal line connected to the column output line VO4 according to the second select signal φSEL2. When one terminal of the sampling capacitor $C_{SS}$ and the column output line VO4 are connected by the switch S8, a voltage VOP output from the other amplifier output terminal of the amplifier section 5 is input to one terminal of the sampling capacitor $C_{SS}$ via the column output line VO4 and a switch S16 in the amplifier section 5.

The column output line VO1 is a signal line that connects the other terminal of the sampling capacitor $C_{SR}$ and one amplifier input terminal of the amplifier section 5 when the column output line VO1 is short-circuited by the switch S5. It is assumed that there is a parasitic capacitor $C_{PAR1}$ in the column output line VO1.

The column output line VO2 is a signal line that connects the other terminal of the sampling capacitor $C_{SS}$ and another amplifier input terminal of the amplifier section 5 when the column output line VO2 is short-circuited by the switch S6. It is assumed that there is a parasitic capacitor $C_{PAR2}$ in the column output line VO2.

The column output line VO3 is a signal line that connects one terminal of the sampling capacitor $C_{SR}$ and one amplifier output terminal of the amplifier section 5 when the column output line VO3 is short-circuited by the switch S7. It is assumed that there is a parasitic capacitor $C_{PAR3}$ in the column output line VO3.

The column output line VO4 is a signal line that connects one terminal of the sampling capacitor $C_{SS}$ and another amplifier output terminal of the amplifier section 5 when the column output line VO4 is short-circuited by the switch S8. It is assumed that there is a parasitic capacitor $C_{PAR4}$ in the column output line VO4.

The amplifier section 5 amplifies the signal voltages sampled by the column circuit unit 4 and outputs the amplified signal voltages as voltages corresponding to the signal voltages output from the pixels 1. The amplifier section 5 includes an operational amplifier circuit AMP, a feedback capacitor $C_{FB1}$, a feedback capacitor $C_{FB2}$, and switches S9 to S16.

The operational amplifier circuit AMP is configured such that the reset signal voltage VR input from the column circuit unit 4 to one amplifier input terminal of the amplifier section 5 via the column output line VO1 is input to one input terminal thereof and the input reset signal voltage VR is amplified based on the clamp voltage VCM and output from one output terminal thereof. The operational amplifier circuit AMP amplifies the reset signal voltage VR output from the pixel 1 with a gain "1" (gain=1), outputs the amplified reset signal voltage VR from the amplifier section 5 as the reset signal voltage VOM, and outputs the reset signal voltage VOM to the column circuit unit 4 via the column output line VO3.

The operational amplifier circuit AMP is also configured such that the optical signal voltage VS input from the column circuit unit 4 to the other amplifier input terminal of the amplifier section 5 via the column output line VO2 is input to the other input terminal thereof and the input optical signal voltage VS is amplified based on the clamp voltage VCM and output from the other output terminal thereof. The operational amplifier circuit AMP amplifies the optical signal voltage VS output from the pixel 1 with a gain "1" (gain=1), outputs the amplified optical signal voltage VS from the amplifier section 5 as the optical signal voltage VOP, and outputs the optical signal voltage VOP to the column circuit unit 4 via the column output line VO4.

The feedback capacitor $C_{FB1}$ is a feedback capacitor disposed between one input terminal of the operational amplifier circuit AMP and one output terminal thereof. One input terminal of the operational amplifier circuit AMP is connected to one terminal of the feedback capacitor $C_{FB1}$.

The feedback capacitor $C_{FB2}$ is a feedback capacitor disposed between the other input terminal of the operational amplifier circuit AMP and the other output terminal thereof. The other input terminal of the operational amplifier circuit AMP is connected to one terminal of the feedback capacitor $C_{FB2}$.

The switch S9 is a switch that initializes the operational amplifier circuit AMP and allows one input terminal of the operational amplifier circuit AMP to be short-circuited to one output terminal thereof according to a driving signal φ1 to thereby initialize the operational amplifier circuit AMP.

The switch S10 is a switch that initializes the operational amplifier circuit AMP and allows the other input terminal of the operational amplifier circuit AMP to be short-circuited to the other output terminal according to the driving signal φ1 to thereby initialize the operational amplifier circuit AMP.

The switch S11 is a switch that connects the other terminal of the feedback capacitor $C_{FB1}$ and one output terminal of the operational amplifier circuit AMP when the column circuit unit 4 performs an operation of transferring the reset signal voltage VR sampled to the sampling capacitor $C_{SR}$ to the amplifier section 5, and allows the other terminal of the feedback capacitor $C_{FB1}$ to be short-circuited to a signal line connected to one output terminal of the operational amplifier circuit AMP according to a driving signal φ3. The switch S11 forms a feedback circuit to which the feedback capacitor $C_{FB1}$ is connected between one input terminal of the operational amplifier circuit AMP and one output terminal thereof.

The switch S12 is a switch that connects the other terminal of the feedback capacitor $C_{FB2}$ and the other output terminal of the operational amplifier circuit AMP when the column circuit unit 4 performs an operation of transferring the optical signal voltage VS sampled to the sampling capacitor $C_{SS}$ to the amplifier section 5, and allows the other terminal of the feedback capacitor $C_{FB2}$ to be short-circuited to a signal line connected to the other output terminal of the operational amplifier circuit AMP according to the driving signal φ3. The switch S12 forms a feedback circuit to which the feedback capacitor $C_{FB2}$ is connected between the other input terminal of the operational amplifier circuit AMP and the other output terminal thereof.

The switch S13 is a switch that connects the other terminal of the feedback capacitor $C_{FB1}$ and the clamp voltage VCM when the column circuit unit 4 performs an operation of transferring the reset signal voltage VR sampled to the sampling capacitor $C_{SR}$ to the amplifier section 5, and allows the other terminal of the feedback capacitor $C_{FB1}$ to be short-circuited to the clamp voltage VCM according to a driving signal φ4.

The switch S14 is a switch that connects the other terminal of the feedback capacitor $C_{FB2}$ and the clamp voltage VCM when the column circuit unit 4 performs an operation of transferring the optical signal voltage VS sampled to the sampling capacitor $C_{SS}$ to the amplifier section 5, and allows the other terminal of the feedback capacitor $C_{FB2}$ to be short-circuited to the clamp voltage VCM according to the driving signal φ4.

The switch S15 is a switch that connects one output terminal of the operational amplifier circuit AMP and the column output line VO3 when the column circuit unit 4 performs an operation of transferring the reset signal voltage VR sampled to the sampling capacitor $C_{SR}$ to the amplifier section 5, and allows one output terminal of the operational amplifier circuit AMP to be short-circuited to the column output line VO3 according to the driving signal φ2. When one output terminal of the operational amplifier circuit AMP is connected to the column output line VO3 by the switch S15, the voltage VOM output from one output terminal of the operational amplifier circuit AMP is input to one terminal of the sampling capacitor CsR via the column output line VO3 and the switch S7 in the column circuit unit 4.

The switch S16 is a switch that connects the other output terminal of the operational amplifier circuit AMP and the column output line VO4 when the column circuit unit 4 performs an operation of transferring the optical signal voltage VS sampled to the sampling capacitor $C_{SS}$ to the amplifier section 5, and allows the other output terminal of the operational amplifier circuit AMP to be short-circuited to a signal line connected to the column output line VO4 according to the driving signal φ2. When the other output terminal of the operational amplifier circuit AMP is connected to the column output line VO4 by the switch S16, the voltage VOP output from the other output terminal of the operational amplifier circuit AMP is input to one terminal of the sampling capacitor $C_{SS}$ via the column output line VO4 and the switch S8 in the column circuit unit 4.

As described above, the signal readout circuit of the second embodiment has a configuration in which both terminals of the sampling capacitors (the sampling capacitors $C_{SR}$ and $C_{SS}$) in the column circuit unit 4 are switchably connected to the amplifier section 5 similarly to the signal readout circuit of the first embodiment. More specifically, the signal readout circuit further includes the same switches S7 and S8 as the signal readout circuit of the first embodiment in the column circuit unit 4 in addition to the switches S5 and S6 which were provided in the conventional signal processing circuit. With this configuration, the sampling capacitors provided in the column circuit unit 4 can also operate as a feedback capacitor connected between one input terminal of the operational amplifier circuit AMP and one output terminal similarly to the signal readout circuit of the first embodiment.

Next, the operation timings of the signal readout circuit of the second embodiment will be described. FIG. 8 is a timing chart illustrating an example of signal readout timings in the signal readout circuit of the second embodiment. FIG. 8 illustrates an example of operation timings in which the reset signal voltage VR and the optical signal voltage VS output from one pixel 1 to the pixel output line VCOLPIX are sampled to output the reset signal voltage VOM having the potential corresponding to the reset signal voltage VR and the optical signal voltage VOP having the potential corresponding to the optical signal voltage VS, similarly to the operation timings of the signal readout circuit of the first embodiment illustrated in FIG. 2. That is, the operation timings illustrated in FIG. 8 are the operation timings in which the signal voltages output from one pixel 1 are read and output to the constituent elements of the subsequent stage similarly to the operation timings of the signal readout circuit of the first embodiment.

In the signal readout circuit of the second embodiment, first, in a sampling period, the column circuit unit 4 samples the reset signal voltage VR and the optical signal voltage VS input from the pixels 1 via the pixel output line VCOLPIX. The driving signal φ1 is set to a "High" level before the sampling period starts so that the switches S9 and S10 enter an ON state. Moreover, the driving signal φ3 is set to the "High" level so that the switches S11 and S12 enter the ON state and the operational amplifier circuit AMP in the amplifier section 5 is held in an initialized state. As a result, the potential of the clamp voltage VCM is output from the output terminals of the operational amplifier circuit AMP.

In the sampling period, at time t1, the clamp signal φCL is set to the "High" level so that the switches S3 and S4 enter the ON state and the other terminal of the sampling capacitor $C_{SR}$ and the other terminal of the sampling capacitor $C_{SS}$ are short-circuited to the clamp voltage VCM. That is, the sampling capacitors $C_{SR}$ and $C_{SS}$ are clamped by the clamp voltage VCM.

After that, the sampling signal φSHR is set to the "High" level so that the reset signal voltage VR input from the pixel 1 via the pixel output line VCOLPIX is input to one terminal of the sampling capacitor $C_{SR}$ whereby an electric charge corresponding to a potential difference between the reset signal voltage VR and the clamp voltage VCL (that is, an electric charge corresponding to a potential difference between a reference voltage and the clamp voltage VCL) is sampled to the sampling capacitor $C_{SR}$ at time t2.

After that, the sampling signal φSHR is set to a "Low" level so that the input of the reset signal voltage VR to one terminal of the sampling capacitor $C_{SR}$ is stopped. After that, the sampling signal φSHS is set to the "High" level so that the optical signal voltage VS input from the pixel 1 via the pixel output line VCOLPIX is input to one terminal of the sampling capacitor $C_{SS}$. At time t3, an electric charge corresponding to a potential difference between the optical signal voltage VS and the clamp voltage VCL (that is, the reset signal voltage VR generated after the pixels are reset) and an electric charge corresponding to a potential difference between the clamp voltage VCL and the signal voltage including the perspective view indicating only subject light to which the pixels 1 are exposed are sampled to the sampling capacitor $C_{SS}$.

After that, the sampling signal φSHS is set to the "Low" level so that the input of the optical signal voltage VS to one terminal of the sampling capacitor $C_{SS}$ is stopped (that is, a sampling period in which the electric charges corresponding to the potential differences between the clamp voltage VCL and the reset signal voltage VR and the optical signal voltage VS are sampled to the sampling capacitors $C_{SR}$ and $C_{SS}$, respectively, ends). After that, the sampled signal voltages are held for a predetermined period. After the predetermined period ends, the sampled electric charges are transferred to the operational amplifier circuit AMP in the amplifier section 5 in a signal transfer period.

The clamp signal φCL is set to the "Low" level before the signal transfer period starts so that the switches S3 and S4 enter an OFF state and short-circuiting of the other terminal of the sampling capacitor $C_{SR}$ and the other terminal of the sampling capacitor $C_{SS}$ to the clamp voltage VCM is stopped. Moreover, the driving signal φ1 is set to the "Low" level so that the switches S9 and S10 enter the OFF state and the initialization of the operational amplifier circuit AMP is released.

In the signal readout circuit of the second embodiment, signals are transferred twice in the signal transfer period. First, in a first signal transfer period, at time t4, the driving signal φCB is set to the "High" level. As a result, when the switch S0 enters the ON state, the node of one terminal of the sampling capacitor $C_{SR}$ in the column circuit unit 4 and the node of one terminal of the sampling capacitor $C_{SS}$ are short-circuited, and the potential of the sampling node between the sampling capacitors $C_{SR}$ and $C_{SS}$ is set to an intermediate potential between the reset signal voltage VR and the optical signal voltage VS. As a result, the electric charge corresponding to a change in the potential of one terminal of the sampling capacitor $C_{SR}$ (that is, an electric charge which is the product of the potential difference between the potential of the reset signal voltage VR and the intermediate potential and the capacitance value of the sampling capacitor $C_{SR}$) is discharged to the node of the other terminal of the sampling capacitor $C_{SR}$ clamped by the clamp voltage VCM. Moreover, since the potential of the sampling node is set to the intermediate potential between the reset signal voltage VR and the optical signal voltage VS, the electric charge corresponding to a change in the potential of one terminal of the sampling capacitor $C_{SS}$ (that is, an electric charge which is the product of the potential difference between the potential of the optical signal voltage VS and the intermediate potential and the capacitance value of the sampling capacitor $C_{SS}$) is discharged to the node of the other terminal of the sampling capacitor $C_{SS}$.

At time t4, the first select signal φSEL1 is set to the "High" level. As a result, when the switch S5 enters the ON state, the other terminal of the sampling capacitor $C_{SR}$ in the column circuit unit 4 and one input terminal of the operational amplifier circuit AMP in the amplifier section 5 are connected via the column output line VO1. In this case, the initialization of the operational amplifier circuit AMP is released when the driving signal φ1 is set to the "Low" level, and a charge amplifier circuit in which one input terminal of the operational amplifier circuit AMP and one terminal of the feedback capacitor $C_{FB1}$ are connected and one output terminal of the operational amplifier circuit AMP and the other terminal of the feedback capacitor $C_{FB1}$ are connected is formed. Thus, the electric charge discharged to the node of the other terminal of the sampling capacitor $C_{SR}$ is drawn from the other terminal of the feedback capacitor $C_{FB1}$, and the voltage of one output terminal of the operational amplifier circuit AMP is set to the reset signal voltage VOM that is proportional to the potential difference between the clamp voltage VCL and the reset signal voltage VR sampled by the sampling capacitor $C_{SR}$. In the following description, the reset signal voltage VOM output in the first signal transfer period will be referred to as a "first reset signal voltage VOM1."

Moreover, when the first select signal φSEL1 is set to the "High" level so that the switch S6 enters the ON state, the other terminal of the sampling capacitor $C_{SS}$ in the column circuit unit 4 and the other input terminal of the operational amplifier circuit AMP in the amplifier section 5 are connected via the column output line VO2. In this case, the initialization of the operational amplifier circuit AMP is released when the driving signal φ1 is set to the "Low" level, and a charge amplifier circuit in which the other input terminal of the operational amplifier circuit AMP and one terminal of the feedback capacitor $C_{FB2}$ are connected and the other output terminal of the operational amplifier circuit AMP and the other terminal of the feedback capacitor $C_{FB2}$ are connected is formed. Thus, the electric charge discharged to the node of the other terminal of the sampling capacitor $C_{SS}$ is drawn from one terminal of the feedback capacitor $C_{FB2}$, and the voltage of the other output terminal of the operational amplifier circuit AMP is set to the optical signal voltage VOP that is proportional to the potential difference between the clamp voltage VCL and the optical signal voltage VS sampled by the sampling capacitor $C_{SS}$. In the following description, the optical signal voltage VOP output in the first signal transfer period will be referred to as a "first optical signal voltage VOP1."

In this way, in the signal readout circuit of the second embodiment, the electric charge corresponding to the potential difference between the clamp voltage VCL and the reset signal voltage VR sampled to the sampling capacitor $C_{SR}$ and the electric charge corresponding to the potential difference between the clamp voltage VCL and the optical signal voltage VS sampled to the sampling capacitor $C_{SS}$ are transferred to the operational amplifier circuit AMP in the first signal transfer period. As a result, the operational amplifier circuit AMP outputs the first reset signal voltage VOM1 and the first optical signal voltage VOP1 in the first signal transfer period.

After that, the driving signal φ3 is set to the "Low" level so that the feedback capacitors $C_{FB1}$ and $C_{FB2}$ connected to the operational amplifier circuit AMP are separated. Moreover, the driving signal φCB is set to the "Low" level so that the node of one terminal of the sampling capacitor $C_{SR}$ and the node of one terminal of the sampling capacitor $C_{SS}$ are separated. After that, the first signal transfer period ends.

The constituent element on the subsequent stage performs an operation of calculating the difference between the first reset signal voltage VOM1 output from one output terminal of the operational amplifier circuit AMP and the first optical signal voltage VOP1 output from the other output terminal thereof to obtain a signal component Vsig of only subject light to which the pixels 1 are exposed. In the following description, the signal component Vsig obtained in the first signal transfer period will be referred to as a "first signal component Vsig1."

The operation up to the first signal transfer period, of the signal readout circuit of the second embodiment is the same as the operation of the conventional signal processing circuit. Due to this, the first reset signal voltage VOM1 and the first optical signal voltage VOP1 output by the operational amplifier circuit AMP in the first signal transfer period are influenced by the variation in the capacitance value of the respective sampling capacitors (the sampling capacitors $C_{SR}$ and $C_{SS}$) provided in the column circuit unit 4 and the nonlinear junction capacitance characteristics of the MOS transistors associated with the nodes connected to the respective sampling capacitors similarly to the conventional signal processing circuit. Moreover, the first reset signal voltage VOM1 and the first optical signal voltage VOP1 are also influenced by the parasitic capacitors in the four column output lines VO1 to VO4.

In the signal readout circuit of the second embodiment, for example, the connection capacitors associated with the nodes connected to one terminal of the sampling capacitor $C_{SR}$ are the junction capacitances of the MOS transistor that forms the switch S1 driven by the sampling signal φSHR, the MOS transistor that forms the switch S0 driven by the driving signal φCB, and the MOS transistor that forms the switch S7 driven by the second select signal φSEL2. Moreover, the connection capacitors associated with the nodes connected to the other terminal of the sampling capacitor $C_{SR}$ are the junction capacitances of the MOS transistor that forms the switch S3 driven by the clamp signal φCL and the MOS transistor that forms the switch S5 driven by the first select signal φSEL1.

Thus, in the signal readout circuit of the second embodiment, a reset signal voltage VOM and an optical signal voltage VOP used for correcting (cancelling) the influence of the variation in the capacitance value of the respective sampling capacitors provided in the column circuit unit 4 and the nonlinear junction capacitance characteristics of the MOS transistors associated with the nodes connected to the respective sampling capacitors and the influence of the parasitic capacitors in the four column output lines VO1 to VO4 are output in the second signal transfer period. In the following description, the reset signal voltage VOM output in the second signal transfer period will be referred to as a "second reset signal voltage VOM2" and the optical signal voltage VOP output in the second signal transfer period will be referred to as a "second optical signal voltage VOP2."

The second select signal φSEL2 is set to the "High" level before the second signal transfer period starts so that the switches S7 and S8 enter the ON state. Moreover, the driving signal φ2 is set to the "High" level so that the switches S15 and S16 enter the ON state. When the switches S7 and S15 enter the ON state, one terminal of the sampling capacitor $C_{SR}$ in the column circuit unit 4 is connected to one output terminal of the operational amplifier circuit AMP in the amplifier section 5 via the column output line VO3, and the sampling capacitor $C_{SR}$ operates as a feedback capacitor disposed between one input terminal of the operational amplifier circuit AMP and one output terminal thereof. Moreover, when the switches S8 and S16 enter the ON state, one terminal of the sampling capacitor $C_{SS}$ in the column circuit unit 4 is connected to the other output terminal of the operational amplifier circuit AMP in the amplifier section 5 via the column output line VO4, and the sampling capacitor $C_{SR}$ operates as a feedback capacitor disposed between the other input terminal of the operational amplifier circuit AMP and the other output terminal thereof. After that, the second signal transfer period starts.

In the second signal transfer period, at time t5, when the driving signal φ4 is set to the "High" level, the switches S13 and S14 enter the ON state and the other terminal of the feedback capacitor $C_{FB1}$ and the other terminal of the feedback capacitor $C_{FB2}$ are short-circuited to the clamp voltage VCM. That is, a state in which the feedback capacitors $C_{FB1}$ and $C_{FB2}$ are clamped by the clamp voltage VCM is created.

As a result, an electric charge proportional to the first reset signal voltage VOM1 held in the feedback capacitor $C_{FB1}$ at the end of the first signal transfer period is supplied in a reverse direction from one terminal of the feedback capacitor $C_{FB1}$ toward the other terminal of the sampling capacitor $C_{SR}$ and is transferred to the sampling capacitor $C_{SR}$. In this case, a feedback circuit in which one input terminal of the operational amplifier circuit AMP is connected to the other terminal of the sampling capacitor $C_{SR}$, and one output terminal of the operational amplifier circuit AMP is connected to one terminal of the sampling capacitor $C_{SR}$ is formed. Thus, the electric charge supplied in the reverse direction toward the other terminal of the sampling capacitor $C_{SR}$ is drawn from the other terminal of the sampling capacitor $C_{SR}$, and the voltage of one output terminal of the operational amplifier circuit AMP is set to a second reset signal voltage VOM2 proportional to the potential difference between the clamp voltage VCL and the first reset signal voltage VOM1 at the end of the first signal transfer period.

An electric charge proportional to the first optical signal voltage VOP1, held in the feedback capacitor $C_{FB2}$ at the end of the first signal transfer period is supplied in a reverse direction from one terminal of the feedback capacitor $C_{FB2}$ toward the other terminal of the sampling capacitor $C_{SS}$ and is transferred to the sampling capacitor $C_{SS}$. In this case, a feedback circuit in which the other input terminal of the operational amplifier circuit AMP is connected to the other terminal of the sampling capacitor $C_{SS}$ and the other output terminal of the operational amplifier circuit AMP is connected to one terminal of the sampling capacitor $C_{SS}$ is formed. Thus, the electric charge supplied in the reverse direction toward the other terminal of the sampling capacitor $C_{SS}$ is drawn from the other terminal of the sampling capacitor $C_{SS}$, and the voltage of the other output terminal of the operational amplifier circuit AMP is set to a second optical signal voltage VOP2 proportional to the potential difference between the clamp voltage VCL and the first optical signal voltage VOP1 at the end of the first signal transfer period.

In this way, in the signal readout circuit of the second embodiment, an electric charge corresponding to the potential difference between the clamp voltage VCL and the first reset signal voltage VOM1 at the end of the first signal transfer period and the electric charge corresponding to the potential difference between the clamp voltage VCL and the first optical signal voltage VOP1 at the end of the first signal transfer period are transferred to the sampling capacitors $C_{SR}$ and $C_{SS}$ in the second signal transfer period. As a result, the operational amplifier circuit AMP outputs the second reset signal voltage VOM2 and the second optical signal voltage VOP2 in the second signal transfer period.

After that, at time t6, when the driving signal φ4 is set to the "Low" level, the switches S13 and S14 enter the OFF state so that the short-circuiting to the clamp voltage VCM of the other terminal of the feedback capacitor $C_{FB1}$ and the other terminal of the feedback capacitor $C_{FB2}$ stops. Moreover, the first select signal φSEL1, the second select signal φSEL2, and the driving signal φ2 are set to the "Low" level so that the connections between the sampling capacitors $C_{SR}$ and $C_{SS}$ and the operational amplifier circuit AMP, and the feedback capacitors $C_{FB1}$ and $C_{F2}$ are separated. After that, the second signal transfer period ends. After the second signal transfer period ends, the driving signal φ1 may be set to the "High" level so that the switches S9 and S10 enter the ON state. Moreover, the driving signal φ3 may be set to the "High" level so that the switches S11 and S12 enter the ON state and the operational amplifier circuit AMP is initialized again.

The constituent element on the subsequent stage performs a calculation process based on the first signal component Vsig1 obtained in the first signal transfer period, the second reset signal voltage VOM2 output from one output terminal of the operational amplifier circuit AMP in the second signal transfer period, and the second optical signal voltage VOP2 output from the other output terminal thereof to obtain a final signal component Vsig of only the subject light to which the pixels 1 are exposed. The signal component Vsig obtained herein is a signal in which the influences of the variation in the capacitance value of the sampling capacitors provided in the column circuit unit 4 and the nonlinear junction capacitance characteristics of the MOS transistors associated with the nodes connected to the respective sampling capacitors and the influence of the parasitic capacitors in the four column output lines VO1 to VO4 included in the first signal component Vsig1 are corrected (cancelled).

Here, the relationship between the reset signal voltage VOM and the optical signal voltage VOP output in each of the first and second signal transfer periods in the signal transfer period of the second embodiment will be described.

First, the first reset signal voltage VOM1 and the first optical signal voltage VOP1 output in the first signal transfer period will be described. In the first signal transfer period, as described above, the first reset signal voltage VOM1 and the first optical signal voltage VOP1 are output by the same operation as the operation of the conventional signal processing circuit. That is, in the first signal transfer period, the first reset signal voltage VOM1 and the first optical signal voltage VOP1 obtained by converting the signal voltages output from the respective pixels 1 to electric charges and then converting the electric charges to voltages are output. Thus, the first reset signal voltage VOM1 and the first optical signal voltage VOP1 are vulnerable to all influences of the signal readout circuit such as the variation in the capacitance value of the sampling capacitors provided in the column circuit unit 4, the nonlinear junction capacitance characteristics of the MOS transistors associated with the nodes connected to the respective sampling capacitors, the variation in the capacitance value of the feedback capacitors provided in the amplifier section 5, and the variation in the parasitic capacitors in the column output lines between the column circuit unit 4 and the amplifier section 5. Thus, the first signal component Vsig1 obtained by the constituent element on the subsequent stage performing a difference calculation operation has such variation characteristics as expressed by Expression (1) below.

$$Vsig1 = VOP1 - VOM1 \quad \text{(Expression (1))}$$
$$= -\frac{C_S + \Delta C_S + f_1(C_{j,S}, C_{j,R}, VS, VR)}{C_{FB} + \Delta C_{FB} + C_{j,S}(VS) + C_{j,R}(VR)} \cdot (VR - VS) \cdot$$
$$f_2(C_{PAR1}, C_{PAR2}, C_{PAR3}, C_{PAR4})$$
$$= -\frac{C'_S}{C'_{FB}} \cdot (VR - VS)$$

In Expression (1), $C_S$ indicates a capacitance value (design value) of respective sampling capacitors and $\Delta C_S$ indicates a variation in the capacitance value of the respective sampling capacitors. Moreover, in Expression (1), $C_{FB}$ indicates a capacitance value (design value) of the respective sampling capacitors and $\Delta C_{FB}$ indicates a variation in the capacitance value of the respective sampling capacitors. Moreover, in Expression (1), f1 indicates an equivalent function of a nonlinear junction capacitance, $C_{j,s}$ and $C_{j,r}$ indicate nonlinear characteristics of the MOS transistors associated with the nodes connected to the sampling capacitors $C_{SR}$ and $C_{SS}$, and VR and VS indicate the voltage values of the reset signal voltage VR and the optical signal voltage VS. Moreover, $f1(C_{j,s}, C_{j,r}, VR, VS)$ indicates the capacitance value of an equivalent junction capacitance of the sampling capacitor. Moreover, in Expression (1), f2 indicates an equivalent function of an input parasitic capacitor of the operational amplifier circuit AMP, $C_{PAR1}$ indicates a capacitance value of a parasitic capacitor of the column output line VO1, $C_{PAR2}$ indicates a capacitance value of a parasitic capacitor of the column output line VO2, $C_{PAR3}$ indicates a capacitance value of a parasitic capacitor of the column output line VO3, and $C_{PAR4}$ indicates a capacitance value of a parasitic capacitor of the column output line VO4. Moreover, $f2(C_{PAR1}, C_{PAR2}, C_{PAR3}, C_{PAR4})$ indicates a capacitance value of an equivalent input parasitic capacitor of the operational amplifier circuit AMP. Further, in Expression (1), C's indicates an overall variation of the sampling capacitor and $C'_{FB}$ indicates an overall variation of the feedback capacitor.

As described above, in the first signal transfer period, as illustrated in Expression (1), it is possible to obtain the first signal component Vsig1 in which the variation characteristics are represented by $-(C'_S/C'_{FB})$.

Next, the second reset signal voltage VOM2 and the second optical signal voltage VOP2 output in the second signal transfer period will be described. In the second transfer operation, as described above, the circuit configuration of the signal readout circuit is switched by the respective switches so that the sampling capacitors operate as feedback capacitors, and then the feedback capacitors in the first transfer operation are short-circuited to the clamp voltage VCM. As a result, in the second signal transfer period, substantially all electric charges generated in the respective feedback capacitors in the first transfer operation are supplied in the reverse direction toward the corresponding sampling capacitors. That is, substantially all electric charges generated in the feedback capacitors are returned to the corresponding sampling capacitors. The respective sampling capacitors operate as the feedback capacitors, and the operational amplifier circuit AMP outputs the second reset signal voltage VOM2 and the second optical signal voltage VOP2 proportional to the electric charges returned to the respective sampling capacitors. In this case, the second reset signal voltage VOM2 and the second optical signal voltage VOP2 are vulnerable to all influences of the signal readout circuit similarly to the first reset signal voltage VOM1 and the first optical signal voltage VOP1. However, since the flow of electric charges when the second reset signal voltage VOM2 and the second optical signal voltage VOP2 are output is reverse to the flow of the electric charges when the first reset signal voltage VOM1 and the first optical signal voltage VOP1 are output, the obtained signal has the opposite characteristics from the variation characteristics of Expression (1). That is, a signal in which the variation characteristics are $-(C'_{FB}/C'_S)$ is obtained.

Thus, when the constituent element on the subsequent stage performs such a calculation process as indicated by the following Expression (2) based on the first signal component Vsig1 obtained in the first signal transfer period and the second reset signal voltage VOM2 and the second optical signal voltage VOP2 output in the second signal transfer period, it is possible to obtain a final signal component Vsig in which all capacitor variations and all nonlinear characteristics in the signal readout circuit are corrected (cancelled).

$$Vsig = VOP2 - VOM2 \quad \text{(Expression (2))}$$
$$= -\frac{C'_{FB}}{C'_S} \cdot Vsig1$$

-continued $$= -\frac{C'_{FB}}{C'_S}\left\{-\frac{C'_S}{C'_{FB}}\cdot(VR-VS)\right\}$$

$$= (VR-VS)$$

In this way, in the signal readout circuit of the second embodiment, it is possible to obtain the signal component Vsig in which all influences such as the variation in the capacitance value of the respective sampling capacitors, the nonlinear junction capacitance characteristics of the MOS transistors associated with the nodes connected to the respective sampling capacitors, the variation in the capacitance value of the feedback capacitors, and the variation in the parasitic capacitors in the respective column output lines between the column circuit unit 4 and the amplifier section 5 are corrected (cancelled).

In other words, in the second signal transfer period, it is possible to obtain the signal component Vsig in which all influences in the signal readout circuit are corrected (cancelled) by multiplying by a function inverse to that of the first signal transfer period. For example, if an input/output transfer function from the sampling capacitor to the output of the operational amplifier circuit AMP in the first signal transfer period is "input/output transfer function=A," the input/output transfer function in the second signal transfer period is "input/output transfer function=1/A." Due to this, when the input/output transfer functions of the respective signal transfer periods are multiplied, the final transfer function of the signal readout circuit becomes "transfer function=1" and a signal component of only the subject light to which the pixels 1 are exposed can be obtained. That is, even when the characteristics of the constituent elements of the signal readout circuit of the second embodiment vary, the gain becomes very close to "1," and signal voltages of which the level (voltage value) rarely changes can be output like the output of the signal voltages of the signal readout circuit of the first embodiment illustrated in FIG. 3B.

Similarly to the signal readout circuit of the first embodiment, the signal readout circuit of the second embodiment is most effective in suppressing deterioration of the image quality in a CMOS image sensor in which the signal readout circuit of the second embodiment is provided in each column of the pixel array. The configuration and the operation of the CMOS image sensor in which the signal readout circuit of the second embodiment is provided in each column of the pixel array can be similarly conceived by replacing the signal readout circuit of the first embodiment in the configuration and the operation of the CMOS image sensor in which the signal readout circuit of the first embodiment illustrated in FIGS. 4 to 6 is provided in each column of the pixel array with the signal readout circuit of the second embodiment. Thus, the detailed description thereof will not be provided.

According to the signal readout circuit of the second embodiment, the amplifier section 5 further includes a third capacitor (the feedback capacitor $C_{FB1}$) and a fourth capacitor (the feedback capacitor $C_{FB2}$) in addition to the configuration of the amplifier section 3 provided in the signal readout circuit of the first embodiment, and the switch circuit (the switches S0 to S8 and the switches S9 to S16) allows one terminal of the sampling capacitor $C_{SR}$ to be connected to one terminal of the sampling capacitor $C_{SS}$, the other terminal of the feedback capacitor $C_{FB1}$ to be connected between one terminal of the sampling capacitor $C_{SR}$ and one output terminal of the operational amplifier circuit AMP, and the other terminal of the feedback capacitor $C_{FB2}$ to be connected between one terminal of the sampling capacitor $C_{SS}$ and the other output terminal of the operational amplifier circuit AMP when the switch circuit (the switches S0 to S8 and the switches S9 to S16) is in a third state (a state in the first signal transfer period) before the second state (the state in the second signal transfer period) starts and after the first state (the state in the sampling period) ends. Further to an operation in the third state, when the switch circuit (the switches S0 to S8 and the switches S9 to S16) is in the second state (the state in the second signal transfer period), the switch circuit (the switches S0 to S8 and the switches S9 to S16) switches the connections of the respective terminals so that, the feedback capacitor $C_{FB1}$ is connected between the other terminal of the sampling capacitor $C_{SR}$ and a predetermined fixed potential (the clamp voltage VCM) and the feedback capacitor $C_{FB2}$ is connected between the other terminal of the sampling capacitor $C_{SS}$ and the clamp voltage VCM.

As described above, in the signal readout circuit of the second embodiment, the reset signal voltage VOM and the optical signal voltage VOP are output in the first and second signal transfer periods unlike the signal readout circuit of the first embodiment. Moreover, a constituent element on the subsequent stage such as the amplifier circuit 200 illustrated in FIG. 4, for example, performs a calculation process on the reset signal voltage VOM and the optical signal voltage VOP output in the respective signal transfer periods. As a result, it is possible to correct (cancel) all influences of the variations in the characteristics of the constituent elements of the signal readout circuit such as the variation in the capacitance value of the sampling capacitors provided in the signal readout circuit of the second embodiment, the nonlinear junction capacitance characteristics of the MOS transistors associated with the nodes connected to the sampling capacitors, the variation in the capacitance value of the feedback capacitors, and the variation in the parasitic capacitors in the column output lines.

In the signal readout circuit of the second embodiment, it is possible to decrease the capacitance values of the respective sampling capacitors to reduce the layout area of the respective sampling capacitors similarly to the signal readout circuit of the first embodiment. As a result, in the CMOS image sensor in which the signal readout circuit of the second embodiment is provided in each column of the pixel array, it is possible to reduce the area occupied by the signal processing circuit including the signal readout circuit in the CMOS image sensor chip similarly to the CMOS image sensor in which the signal readout circuit of the first embodiment is provided in each column of the pixel array. As a result, it is possible to reduce the size of a chip area of a CMOS image sensor in which the signal readout circuit of the second embodiment is provided in each column of the pixel array, to output image data of digital signals corresponding to a signal component with high accuracy without any noise, and to suppress deterioration of the image quality. For example, even when the CMOS image sensor outputs image data of an image so that the entire screen has the same luminance level, it is possible to output an image without any luminance step.

The signal readout circuit of the second embodiment does not include a voltage amplifier in the column circuit unit 4 similarly to the signal readout circuit of the first embodiment. Due to this, it is possible to reduce the power consumption in the signal readout circuit of the second embodiment similarly to the signal readout circuit of the first embodiment. Moreover, it is possible to reduce the power consumption of a CMOS image sensor in which the signal readout circuit of the second embodiment is provided in each column of the pixel array similarly to the signal readout circuit of the first embodiment.

As described above, the embodiment of the present invention includes a configuration in which both terminals of the sampling capacitors in the column circuit unit provided in the signal readout circuit are switchably connected to an amplifier section on the subsequent stage, and the sampling capacitors operate as feedback capacitors of the operational amplifier circuit provided in the amplifier section. As a result, it is possible to read signals with high accuracy without being influenced by the variation in the capacitance value of the sampling capacitors in the column circuit unit provided in the signal readout circuit of the present invention and the variation in the capacitance value of the junction capacitances of the MOS transistors associated with the nodes connected to the respective sampling capacitors. As a result, in the signal readout circuit of the present invention, it is possible to decrease the capacitance values of the respective sampling capacitors in the column circuit unit and to reduce the layout area of the respective sampling capacitors. That is, the signal readout circuit of the present invention can realize a small size and high accuracy of the signal readout circuit. As a result, even when the signal readout circuit of the present invention is provided in each column of the pixel array of a CMOS image sensor, it is possible to reduce the area occupied by the signal readout circuit in the CMOS image sensor chip, to reduce the chip area of the CMOS image sensor chip, and to realize high image quality.

When the signal readout circuit of the present invention is provided in each column of the pixel array of a CMOS image sensor, a voltage difference between the respective signal voltages output from the signal readout circuits is used, which is equivalent to a difference calculation operation in the correlated double sampling operation. Thus, it is possible to obtain an advantage that an output voltage can be obtained in a state in which the correlated double sampling operation is automatically performed and the common mode voltage is shifted to a desired common mode voltage level.

According to the embodiment of the present invention, since signals are read from the signal readout circuit by transferring the signals twice, the read signals are not influenced by the variation in the capacitance value of the feedback capacitors in the amplifier section and the variation of the parasitic capacitors in the respective column output lines between the column circuit unit and the amplifier section in addition to the variation of the sampling capacitors in the column circuit unit. As a result, the signal readout circuit of the present invention can reduce the size of the feedback capacitors in the amplifier section and further increase the accuracy of the read signals. In particular, when the signal readout circuit of the present invention is provided in each column of the pixel array of a CMOS image sensor, it is possible to suppress the structural noise which can cause a luminance step in the respective columns of the pixel array. Thus, the signal readout circuit of the present invention is effective in a multi-channel readout-type CMOS image sensor that outputs image data simultaneously from a plurality of readout channels. Moreover, in the multi-channel readout-type CMOS image sensor, it is possible to increase the number of columns of the pixel array to which the AD converter provided in each readout channel corresponds (that is, the number of columns of the pixel array output by one readout channel) and to increase the possibility to reduce the power consumption of the entire CMOS image sensor.

The specific configuration of the circuit configuration and the operation method of the signal readout circuit of the present invention are not limited to the embodiments of the present invention but various changes can occur without departing from the spirit of the present invention. For example, even when the sequence or the like of the signal voltages input to the signal readout circuit is changed with a change in the constituent element and the driving method of the pixels provided in the CMOS image sensor, the idea of the present invention can be similarly applied by changing the circuit configuration and the operation method of the signal readout circuit according to the changed constituent element and the changed driving method of the pixels.

The number of virtual areas obtained by virtually dividing the pixel array provided in a CMOS image sensor into a plurality of strip-shaped areas corresponding to a predetermined number of columns is not limited to the number described in the embodiments of the present invention and the number of divisions may be changed without departing from the spirit of the present invention.

In the present embodiment, although an example in which the signal readout circuit of the present invention is mounted on a CMOS image sensor has been described, the system on which the signal readout circuit of the present invention is mounted is not limited to the configuration described in the embodiments of the present invention. For example, when the signal readout circuit of the present invention is mounted as a readout circuit of a sensing chip other than the CMOS image sensor, the same advantages can be obtained. In this case, for example, the pixel section that outputs signal voltages to the signal readout circuit illustrated in FIG. 1 is a signal unit that output signals to the sensing chip, and the column circuit unit 2, the column output lines VO1 to VO4, and the amplifier section 3 of the signal readout circuit correspond to a differential sampling circuit unit, differential sampling circuit output lines, and a differential sampling unit of the sensing chip. Moreover, in this case, in the operation of the signal readout circuit illustrated in FIG. 2, the timings at which the reset signal voltage VR and the optical signal voltage VS are sampled to the respective sampling capacitors in the column circuit unit 2 during the sampling period may be the same timings, and the sampling signal φSHR and the sampling signal φSHS that drive the switches S1 and S2 in the column circuit unit 2 may be the same driving signals.

In the present embodiment, although an example in which the signal readout circuit of the present invention is applied to a multi-channel readout-type CMOS image sensor has been described, the readout type of the CMOS image sensor to which the signal readout circuit of the present invention is applied is not limited to the type described in the embodiments of the present invention. For example, the signal readout circuit of the present invention may be applied to a single-channel readout-type CMOS image sensor. In this case, the constituent elements corresponding to one readout channel illustrated in FIGS. 4 and 5 correspond to the constituent elements of the entire single-channel readout-type CMOS image sensor. More specifically, N columns of the pixels 1 corresponding to one readout channel that outputs the image data of one strip-shaped area that virtually divides the pixel array 100 are the entire number of columns of the pixels disposed in the entire pixel array provided in the single-channel readout-type CMOS image sensor.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A signal readout circuit comprising:
a first capacitor that holds a first electric charge;
a second capacitor that holds a second electric charge;
an amplifier section including an amplifier having first and second input terminals and first and second output terminals, the amplifier outputting a first potential input to the first input terminal to the first output terminal with a gain of 1 and outputting a second potential input to the second input terminal to the second output terminal with a gain of 1; and
a switch circuit that switches on/off state of a connection of a respective terminals including a terminal of the first or second capacitor with at least one of the first and second input terminals and the first and second output terminals of the amplifier, wherein
a difference between the first electric charge and the second electric charge is an amount indicating a voltage value of a predetermined voltage signal,
when the switch circuit is in a first state, the first capacitor holds the first electric charge and the second capacitor holds the second electric charge, and
when the switch circuit is in a second state, the switch circuit switches the connections of the respective terminals so that the first capacitor is connected between the first input terminal and the first output terminal and the second capacitor is connected between the second input terminal and the second output terminal,
wherein the amplifier section further includes:
a third capacitor; and
a fourth capacitor,
the switch circuit is in a third state before the second state starts and after the first state ends, the switch circuit allows the first capacitor to be connected to the second capacitor, the third capacitor to be connected between the first capacitor and the first output terminal, and the fourth capacitor to be connected between the second capacitor and the second output terminal, and
the switch circuit is in the second state, further to an operation in the third state, the switch circuit switches the connections of the respective terminals so that the third capacitor is connected between the first capacitor and a predetermined fixed potential and the fourth capacitor is connected between the second capacitor and the predetermined fixed potential.

2. The signal readout circuit according to claim 1, wherein the first electric charge is an amount of electric charge corresponding to a potential of a reset signal which is output from a pixel section in which a plurality of pixels are disposed in a two-dimensional matrix form and which is generated when a physical amount is not incident on each of the plurality of pixels disposed in the pixel section,
the second electric charge is an amount of electric charge corresponding to the sum of the potential of the reset signal and a potential of a pixel signal which is output from the pixel section and which is generated according to the physical amount incident on each of the plurality of pixels disposed in the pixel section, and
the first and second capacitors are disposed in each column of the plurality of pixels disposed in the pixel section.

3. The signal readout circuit according to claim 2, wherein the amplifier section is disposed in each of a plurality of columns of the plurality of pixels disposed in the pixel section.

4. A method for controlling a signal readout circuit including:
a first capacitor that holds a first electric charge;
a second capacitor that holds a second electric charge;
an amplifier section including an amplifier having first and second input terminals and first and second output terminals, the amplifier outputting a first potential input to the first input terminal to the first output terminal with a gain of 1 and outputting a second potential input to the second input terminal to the second output terminal with a gain of 1; and
a switch circuit that switches on/off state of a connection of a respective terminals including a terminal of the first or second capacitor with at least one of the first and second input terminals and the first and second output terminals of the amplifier,
wherein a difference between the first electric charge and the second electric charge is an amount indicating a voltage value of a predetermined voltage signal, and
the method comprises:
a first state of the switch circuit in which the first capacitor holds the first electric charge and the second capacitor holds the second electric charge; and
a second state of the switch circuit in which the switch circuit switches the connections of the respective terminals so that the first capacitor is connected between the first input terminal and the first output terminal and the second capacitor is connected between the second input terminal and the second output terminal,
wherein the amplifier section further includes:
a third capacitor; and
a fourth capacitor,
the switch circuit is in a third state before the second state starts and after the first state ends,
the switch circuit allows the first capacitor to be connected to the second capacitor,
the third capacitor to be connected between the first capacitor and the first output terminal, and
the fourth capacitor to be connected between the second capacitor and the second output terminal, and
the switch circuit is in the second state, further to an operation in the third state, the switch circuit switches the connections of the respective terminals so that the third capacitor is connected between the first capacitor and a predetermined fixed potential and the fourth capacitor is connected between the second capacitor and the predetermined fixed potential.

* * * * *